US008886645B2

(12) United States Patent
Jones et al.

(10) Patent No.: US 8,886,645 B2
(45) Date of Patent: Nov. 11, 2014

(54) METHOD AND SYSTEM OF MANAGING AND USING PROFILE INFORMATION

(75) Inventors: Scott A. Jones, Carmel, IN (US); Thomas E. Cooper, Indianapolis, IN (US)

(73) Assignee: ChaCha Search, Inc.

( * ) Notice: Subject to any disclaimer, the term of this patent is extended or adjusted under 35 U.S.C. 154(b) by 539 days.

(21) Appl. No.: 12/251,876

(22) Filed: Oct. 15, 2008

(65) Prior Publication Data

US 2009/0100047 A1 Apr. 16, 2009

Related U.S. Application Data

(60) Provisional application No. 60/980,010, filed on Oct. 15, 2007.

(51) Int. Cl.
*G06F 17/30* (2006.01)
*G06F 7/00* (2006.01)
*G06Q 30/02* (2012.01)

(52) U.S. Cl.
CPC ........ *G06F 17/3053* (2013.01); *G06Q 30/0241* (2013.01); *G06Q 30/0224* (2013.01); *G06F 17/30648* (2013.01)
USPC .......................................... 707/733; 707/734

(58) Field of Classification Search
USPC ................................. 707/733, 734
See application file for complete search history.

(56) References Cited

U.S. PATENT DOCUMENTS

| | | |
|---|---|---|
| 5,559,940 A | 9/1996 | Hutson |
| 5,583,763 A * | 12/1996 | Atcheson et al. ............ 707/750 |
| 5,732,259 A | 3/1998 | Konno |
| 5,862,223 A | 1/1999 | Walker |
| 5,867,799 A | 2/1999 | Lang et al. |
| 5,875,231 A | 2/1999 | Farfan |
| 5,884,282 A | 3/1999 | Robinson |
| 5,915,010 A | 6/1999 | McCalmont |
| 5,950,173 A * | 9/1999 | Perkowski .................. 705/27.1 |

(Continued)

FOREIGN PATENT DOCUMENTS

| WO | WO/2007/052285 | 10/2007 |
|---|---|---|
| WO | WO2007052285 | 10/2007 |

OTHER PUBLICATIONS

Lin et al. "Automatic Information Discovery from the 'Invisible Web'" International Conference on Information Technology, Apr. 10, 2002; pp. 332-337.

(Continued)

*Primary Examiner* — Pavan Mamillaphalli
(74) *Attorney, Agent, or Firm* — Staas and Halsey

(57) ABSTRACT

A method and system for matching a search request to a human assistant and/or other items based on information indicated in a profile associated with the search request is described. A ranking of a guide is determined based on matching of information associated with the guide and information associated with a search request. Profile information such as demographic, geographic, personality, areas of interest, people, hobbies, etc. may be used in addition to other information such as keywords or categories which are associated with a request in order to select a guide. Items such as a search result, an advertisement, a search resource, a previous query, etc. may be selected based on profile information associated with the item. Profile information may be associated with an item based on profile information associated with a guide and/or a user who has expressed an opinion regarding the item.

19 Claims, 20 Drawing Sheets

(56) References Cited

U.S. PATENT DOCUMENTS

| | | | |
|---|---|---|---|
| 6,026,148 A | 2/2000 | Dworkin et al. | |
| 6,101,515 A | 8/2000 | Wical | |
| 6,134,532 A * | 10/2000 | Lazarus et al. | 705/14.25 |
| 6,236,978 B1 * | 5/2001 | Tuzhilin | 705/7 |
| 6,308,175 B1 | 10/2001 | Lang et al. | |
| 6,314,420 B1 | 11/2001 | Lang et al. | |
| 6,327,590 B1 * | 12/2001 | Chidlovskii et al. | 707/734 |
| 6,434,549 B1 | 8/2002 | Linetsky et al. | |
| 6,460,036 B1 * | 10/2002 | Herz | 707/748 |
| 6,493,702 B1 * | 12/2002 | Adar et al. | 707/706 |
| 6,505,166 B1 * | 1/2003 | Stephanou | 705/8 |
| 6,507,821 B1 | 1/2003 | Stephanou | |
| 6,507,841 B2 | 1/2003 | Rivierieulx de Varax | |
| 6,513,013 B1 | 1/2003 | Stephanou | |
| 6,523,010 B2 | 2/2003 | Lauffer | |
| 6,526,404 B1 | 2/2003 | Slater | |
| 6,539,377 B1 | 3/2003 | Culliss | |
| 6,578,010 B1 | 6/2003 | Teacherson | |
| 6,578,022 B1 | 6/2003 | Foulger | |
| 6,647,383 B1 | 11/2003 | August | |
| 6,662,177 B1 | 12/2003 | Martino et al. | |
| 6,675,159 B1 | 1/2004 | Lin | |
| 6,798,876 B1 * | 9/2004 | Bala | 379/265.12 |
| 6,801,899 B2 | 10/2004 | Lauffer | |
| 6,832,218 B1 | 12/2004 | Emens et al. | |
| 6,877,034 B1 | 4/2005 | Machin | |
| 6,895,406 B2 | 5/2005 | Fables | |
| 6,901,394 B2 | 5/2005 | Chauhan | |
| 6,952,678 B2 | 10/2005 | Williams | |
| 6,993,496 B2 | 1/2006 | Pittelli | |
| 7,062,510 B1 * | 6/2006 | Eldering | 707/999.101 |
| 7,072,888 B1 * | 7/2006 | Perkins | 707/733 |
| 7,085,771 B2 | 8/2006 | Chung | |
| 7,103,592 B2 * | 9/2006 | Huret | 707/733 |
| 7,120,647 B2 | 10/2006 | Venkatesh et al. | |
| 7,162,433 B1 | 1/2007 | Foroutan | |
| 7,162,522 B2 * | 1/2007 | Adar et al. | 709/224 |
| 7,167,855 B1 | 1/2007 | Koenig | |
| 7,249,045 B2 | 7/2007 | Lauffer | |
| 7,287,021 B2 * | 10/2007 | De Smet | 707/600 |
| 7,450,960 B2 * | 11/2008 | Chen | 455/550.1 |
| 7,483,894 B2 * | 1/2009 | Cao | 707/999.005 |
| 7,650,381 B2 * | 1/2010 | Peters | 709/205 |
| 7,676,034 B1 * | 3/2010 | Wu et al. | 379/265.01 |
| 7,793,326 B2 * | 9/2010 | McCoskey et al. | 725/91 |
| 7,835,998 B2 * | 11/2010 | Aravamudan et al. | 706/11 |
| 2002/0111934 A1 | 8/2002 | Narayan | |
| 2002/0120619 A1 | 8/2002 | Marso | |
| 2002/0167539 A1 | 11/2002 | Brown | |
| 2003/0028451 A1 * | 2/2003 | Ananian | 705/27 |
| 2003/0046098 A1 | 3/2003 | Kim | |
| 2003/0061092 A1 | 3/2003 | Dutta | |
| 2003/0120653 A1 | 6/2003 | Brady | |
| 2003/0140037 A1 | 7/2003 | Deh-Lee | |
| 2003/0145001 A1 | 7/2003 | Craig | |
| 2003/0174818 A1 | 9/2003 | Hazenfield | |
| 2003/0198325 A1 | 10/2003 | Bayne | |
| 2003/0217335 A1 | 11/2003 | Chung | |
| 2004/0010484 A1 | 1/2004 | Foulger | |
| 2004/0023644 A1 | 2/2004 | Montemer | |
| 2004/0024752 A1 | 2/2004 | Manber | |
| 2004/0030566 A1 | 2/2004 | Brooks Rix | |
| 2004/0049541 A1 | 3/2004 | Swahn | |
| 2004/0064351 A1 * | 4/2004 | Mikurak | 705/7 |
| 2004/0203634 A1 | 10/2004 | Wang | |
| 2004/0205065 A1 | 10/2004 | Petras | |
| 2004/0210550 A1 | 10/2004 | Williams | |
| 2004/0264677 A1 * | 12/2004 | Horvitz et al. | 379/265.02 |
| 2005/0033761 A1 | 2/2005 | Guttman | |
| 2005/0035199 A1 | 2/2005 | Goci | |
| 2005/0086290 A1 | 4/2005 | Joyce | |
| 2005/0105712 A1 | 5/2005 | Williams | |
| 2005/0131866 A1 | 6/2005 | Badros | |
| 2005/0136949 A1 | 6/2005 | Barnes, Jr. | |
| 2005/0165780 A1 | 7/2005 | Omega | |
| 2005/0210042 A1 | 9/2005 | Goedken | |
| 2005/0240580 A1 | 10/2005 | Zamir | |
| 2005/0256848 A1 | 11/2005 | Alpert | |
| 2005/0289124 A1 | 12/2005 | Kaiser | |
| 2006/0010105 A1 | 1/2006 | Sarukkai | |
| 2006/0020593 A1 | 1/2006 | Ramsaier | |
| 2006/0047615 A1 * | 3/2006 | Ravin et al. | 706/50 |
| 2006/0129536 A1 | 6/2006 | Foulger | |
| 2006/0155693 A1 | 7/2006 | Chowdhury et al. | |
| 2006/0224442 A1 | 10/2006 | Round | |
| 2006/0288087 A1 | 12/2006 | Sun | |
| 2007/0005344 A1 | 1/2007 | Sandor | |
| 2007/0005698 A1 | 1/2007 | Kumar | |
| 2007/0014422 A1 | 1/2007 | Wesemann | |
| 2007/0014537 A1 | 1/2007 | Wesemann et al. | |
| 2007/0016563 A1 | 1/2007 | Omoigui | |
| 2007/0027859 A1 | 2/2007 | Harney | |
| 2007/0050388 A1 | 3/2007 | Martin | |
| 2007/0067210 A1 | 3/2007 | Rishell | |
| 2007/0081197 A1 | 4/2007 | Omoigui | |
| 2007/0174244 A1 * | 7/2007 | Jones | 707/3 |
| 2007/0192277 A1 | 8/2007 | Jackson | |
| 2007/0233552 A1 | 10/2007 | Maggio | |
| 2007/0294201 A1 * | 12/2007 | Nelken et al. | 706/60 |
| 2009/0037255 A1 | 2/2009 | Chiu | |

OTHER PUBLICATIONS

International Search Report mailed on Dec. 10, 2008 and issued in PCT/US08/79973.
International Preliminary Report on Patentability, issued Apr. 20, 2010 for PCT/US2008/079973.
International Search Report issued Jan. 28, 2008 in PCT_US2007075369.
International Search Report issued Feb. 12, 2008 in PCT_US2007060467.
International Search Report issued Feb. 27, 2008 in PCT_US2007060459.
International Search Report issued Feb. 15, 2008 in PCT_US2007060468.
International Search Report issued Feb. 7, 2008 in PCT_US2007060472.
International Search Report issued Aug. 20, 2008 in PCTUS_2008061605.
Carmel et al., "Searching XML Documents via XML Fragments," 2003, ACM, pp. 151-158.
Google Tutor, "Googling from your Mobile Phone-no Web Browser Needed!,"2005, Google Tour.
Karat et al., "Patterns of Entry and Correction in Large Vocabulary Continuous Speech Recognition Systems," 1999, ACM, pp. 568-575.
Knoblock, Craig A., "Searching the World Wide Web," 1997, IEEE Expert, pp. 8-14.
Sullivan, Danny, "Google Launches Personalized Home Page," Search Engine Watch, May 2005.
Varshney et al., "Voice Over IP," 2002, Communications of theACM, vol. 45, No. 1, pp. 89-96.
International Search Report issued Dec. 10, 2008 in PCT_US2008079973.
International Search Report issued Dec. 12, 2008 in PCT_US2008079973.
International Search Report issued Apr. 20, 2010 in PCT_US2008079973.

* cited by examiner

FIG. 3A

SEARCHER PROFILE RECORD 400

| | Description | Example Content |
|---|---|---|
| 405 | Searcher Profile ID | 'Searcher profile1' |
| 410 | Profile Searcher ID | 'Paula Jones' |
| 415 | Searcher Demographic Profile | 'Female';'DOB February 28, 1982';'White'; 'German-American';'Muslim';'Green Party' |
| 420 | Searcher Geographic Profile | '2120 First Avenue Chicago IL 32611 USA'; 'previous address 5500 East 106th street, Fishers, IN' |
| 425 | Searcher Personality Profile | 'aggressiveness = 4/10'; 'curiosity = 9/10';'pessimism = 3/10'; 'integrity = 10/10';'Brigg-Meyers' 'profile_passiveAggressive' |
| 430 | Searcher Interest Area Profile | 'Colts Fan'; 'Orthodontics'; 'Jazz Music - Satchmo'; 'Photography - Landscape'; 'Food - Italian and French' |

USER PROFILE RECORD

| | Description | Example Content |
|---|---|---|
| 505 | User Profile ID | 'User profile1' |
| 510 | Profile User ID | 'Bill 1023' |
| 515 | User Demographic Profile | 'Male';'DOB February 16, 1985';'White' |
| 520 | User Geographic Profile | 'addr 5884 E116th Street Fishers, IN 46038 '; |
| 525 | User Personality Profile | 'aggressiveness = 10/10'; 'curiosity = 9/10';'pessimism = 9/10'; 'integrity = 2/10';'Brigg-Meyers profile_FieldMarshal';'company president' |
| 530 | User Interest Area Profile | 'Colts Fan'; 'Orthodontics'; 'Rap Music'; 'Photography -Animals'; 'Food - Japanese and Polish' |

FIG. 5

PARAMETRIC PROFILE RECORD
600

| | Description | Example Content |
|---|---|---|
| 605 | Parametric Profile ID | 'Bill 1023_Female' |
| 610 | User ID | 'Bill 1023' |
| 615 | Parameter ID | 'Searcher Demographic Profile';<br>'Searcher Geographic Profile';<br>'Searcher Interest Area Profile' |
| 620 | Parametric Value | 'Female' AND 'DOB < 1/Jan/1980';<br>'Fishers IN';<br>'Colts Fan' |
| 625 | Searcher ID | 'Paula 1126';<br>'Sergei1 1000';<br>'TomC 1023'; |
| 630 | Searcher ratings | '1','3','2' |

FIG. 6

QUERY RECORD 700

| | Description | Example Content |
|---|---|---|
| 705 | Query ID | 'what is the best sports bar in indianapolis?' |
| 710 | Categories/Keywords | 'Entertainment>Dining>Indianapolis';'sports bar'; 'indianapolis' |
| 715 | Results | 'www.colts_bar.com/downtown'; 1_2_3; 'www.bears_bar.com/indy'; 2_3_1; 'www.colts_bar.com/fishers'; 3_1_2; |
| 720 | User List | 'Bill 1023'; 'Janet 1007' |
| 725 | Searcher List | 'TomC 1023'; 'Sergei1 1000'; 'Paula 1126' |
| 730 | Profile Information | 'Bill 1023_Female'; 'Janet 1007_default' |

FIG. 7

KEYWORD RECORD 800

| | Description | Example Content |
|---|---|---|
| 805 | Keyword ID | 'Indianapolis' |
| 810 | Category ID | 'Entertainment>Dining>Indianapolis'; 'Shopping>Electronics>Television'; |
| 815 | Searcher ID | 'TomC 1023', 'Sergei1 1000'; 'Paula 1126' |
| 820 | Category rating | '1';'2' |
| 825 | Searcher rating | '1';'3';'2' |

FIG. 8

CATEGORY RECORD 900

| | Description | Example Content |
|---|---|---|
| 905 | Category ID | 'Entertainment>Dining>Indianapolis'; |
| 910 | Searcher ID | 'TomC 1023',<br>'Sergei1 1000';<br>'Paula 1126' |
| 915 | Searcher rating | '3','2','1' |

FIG. 9

METHOD AND SYSTEM OF MANAGING AND USING PROFILE INFORMATION

CROSS-REFERENCE TO RELATED APPLICATIONS

This application is related to and claims the benefit of U.S. Provisional Application Ser. No. 60/980,010, entitled "METHOD AND SYSTEM FOR MATCHING INFORMATION SEEKERS AND SEARCHERS", by Scott A. Jones et al., filed Oct. 15, 2007, U.S. application Ser. No. 11/779,502, entitled "ANONYMOUS SEARCH SYSTEM USING HUMAN SEARCHERS", by Scott A. Jones, et al., filed Jul. 18, 2007, U.S. application Ser. No. 12/109,776, entitled "METHOD AND SYSTEM FOR IMPROVEMENT OF RELEVANCE OF SEARCH RESULTS", by Scott A. Jones, et al., filed Apr. 25, 2008 and U.S. Provisional Application Ser. No. 60/980,049, entitled "METHOD AND SYSTEM FOR IMPROVEMENT OF RELEVANCE OF SEARCH RESULTS", Attorney Docket No. 1918.1032P, by Scott A. Jones et al., filed Oct. 15, 2007, in the U.S. Patent and Trademark Office, the contents of which are incorporated herein by reference.

BACKGROUND

1. Field

The present invention is related to search engine technologies and specifically to human-assisted search engines. A method and system for enabling explicit and/or implicit attribute(s) selected by a user to be used in association with a search including to select a searcher(s) and/or search result(s) is disclosed.

2. Description of the Related Art

In general search engines are keyword driven systems. Typically, keywords are generated from a user request and matched to target documents, advertisements, etc. This practice is well established by such services as Google® or Dogpile®. In some instances a user may elect to create a personal login. The data provided by a user may include such information as name, address, etc. which may be used to improve the relevance of search results. When a search service provides other services such as email (e.g., Gmail®), or financial services (e.g., Yahoo! Finance), the content of email messages may be scanned in order to determine common associations of keywords, or the content of a user profile provided may be modified. When a query is submitted by a logged-in user, a keyword(s) of the query may be used to find documents which may contain keywords which are commonly associated with any or all of the keywords of the query based on an examination of documents associated with the user, and/or information contained in a user profile.

In a similar manner, a mobile search system may gather information about a user based upon local data of a user device, a user profile from a service provider of wireless and/or wired communication services, a transaction history, etc. Data may be gathered based upon user input, from data obtained by a service provider such as a cellular network operator, or implicit data of a user device (e.g., caller ID, IP address, GPS data, change in location, files stored and/or transmitted to and/or from the device, information of the user device such as display, and other capabilities, etc.)

Such user profiles may be limited by an amount of information which a user is willing to provide to a service provider. Because some types of profile data may be easily associated with a user (e.g., name and address), and may be stored in a database which is inaccessible to or outside the control of a user, a user may provide limited information to a search engine provider due to privacy or other issues.

In the case of a human-assisted search engine, techniques such as those used to create a user profile in a typical search engine may be employed to create the assistant's profile.

When using a search engine in which human assistance is not provided, and/or no information of a searcher(s) is associated with a search result(s) a user profile may be a source of information used to modify a search query. Efforts have been made to provide profiles which may modify a search query using a user profile but such information may not be relevant to a user request.

In light of the above and other limitations and problems in typical use of profiles, a system and method for using a profile(s) to improve the relevance of search results would be greatly appreciated.

SUMMARY

A method and system of matching a guide(s) and/or search result(s) associated with a profile to a user query associated with a profile are described.

Graphical user interfaces and a system embodiment(s) are disclosed.

These together with other aspects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

Aspects and advantages of the disclosure will become apparent and more readily appreciated from the following description of the embodiments, taken in conjunction with the accompanying drawings, of which:

FIGS. 3A and 3B illustrate exemplary GUIs for guide registration.

FIG. 4 illustrates a searcher profile record.

FIG. 5 illustrates a user profile record.

FIG. 6 illustrates a parametric profile record.

FIG. 7 illustrates a query record.

FIG. 8 illustrates a keyword record.

FIG. 9 illustrates a category record.

DETAILED DESCRIPTION OF THE PREFERRED EMBODIMENTS

Figure 1:
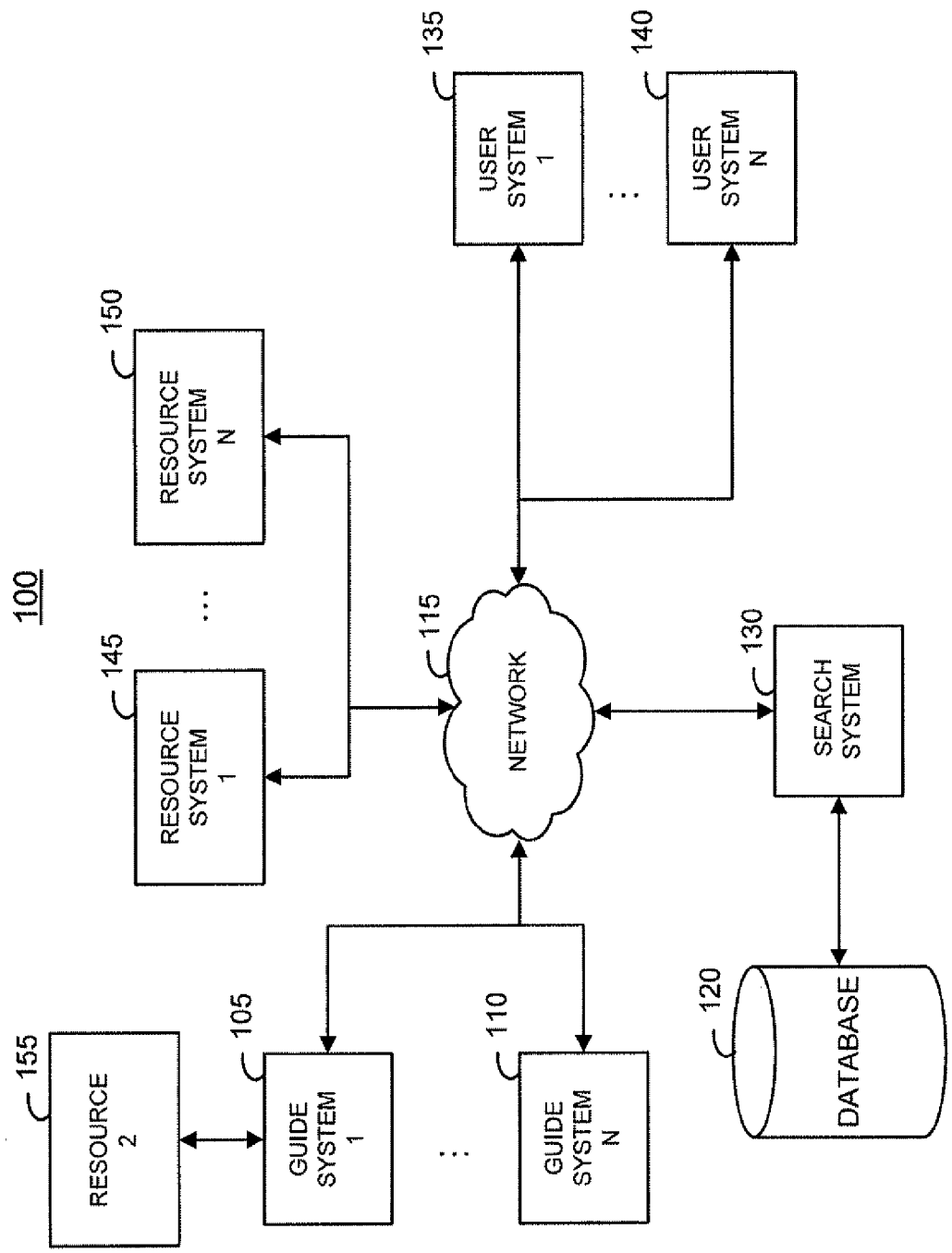
FIG. 1 is a block diagram of a system embodiment.

Reference will now be made in detail to the present embodiments discussed herein, examples of which are illustrated in the accompanying drawings, wherein like reference numerals refer to the like elements throughout. The embodiments are described below to explain the disclosed system and method by referring to the figures. It will nevertheless be understood that no limitation of the scope is thereby intended, such alterations and further modifications in the illustrated device, and such further applications of the principles as illustrated therein being contemplated as would normally occur to one skilled in the art to which the embodiments relate.

In a search system utilizing human searchers or guides, a guide(s) and/or other information such as a search result(s), a search resource(s), an advertisement(s), etc. may be associated with a keyword(s) and/or category(ies) and/or other information which may be associated with a search request or search query in order to select a guide, a search result(s) an advertisement(s) and/or other information which may be relevant to the search request.

In a search system utilizing the assistance of human searcher(s) or 'guides', selection of a guide to respond to a user request may be improved by selecting a guide who has a high ranking associated with content of a query. Likewise, a search result(s) selected by such a guide(s) may be more relevant than a search result(s) selected by a guide with a low ranking associated with the content of the query. However, selection of a guide based on content of a query may not produce a best match between a guide and a user request. Selection of a guide who is associated with a location, a demographic characteristic, a personality type or other characteristics which may or may not be related to the content of a query may improve user experience and relevance of a search result(s) provided. Likewise, ranking and/or selection of a search result(s), a search resource(s), an advertisement(s), or other information based at least in part on information of a characteristic(s) of a person associated with the information may improve the relevance of the information when provided responsive to a query associated with the characteristic(s).

A query is submitted to a search system utilizing the assistance of human searcher(s) or guide(s). A categorization and/or a keyword and/or other information related to a query may be associated with the query or request or search request and is used to rank searchers, search results, search resources, and/or other information. Characteristics which may include geographic, demographic, psychometric, or other properties of a person or a 'profile' may be associated with a search request and a ranking of searchers, search results, search resources, and/or other information may be performed based on the profile associated with the search request.

A ranking of a searcher(s) may be based on a rating(s) of the searcher(s) with respect to information such as a keyword(s), category(ies), etc. associated with a query and a rating(s) of the searcher(s) associated with a profile of the query, which may be used to select a guide or searcher to respond to the request. A weighting may be applied to a rating(s) based on other information associated with a query and a rating(s) based on a profile of the query.

A profile based at least in part on a profile associated with a user submitting a request may be associated with the request. A profile may be associated with a search request or search query by an action of a user submitting the request. A profile may be associated with a query by a guide who may also associate a categorization, keyword and/or other information with the query. A profile may be associated with a query based on information of a user device associated with the query. A profile may be associated with a query automatically and/or using the assistance of a guide.

If a search query is submitted which does not utilize or request the assistance of a guide a user may be provided with a search result(s), a search resource(s), an advertisement(s) and/or other information which is ranked based at least in part on a profile associated with the query. A ranking of a search result(s), an advertisement(s), a search resource(s), or other information may be based at least in part on a profile associated with a person (e.g., a guide, an information seeker, etc.) who has provided and/or expressed an opinion regarding the information.

One or more characteristics of a person or 'profile' may be associated with a request in order to select a guide, a search result(s) and/or other information based on the profile. A rating(s) based on a profile associated with a query or search request may be used to improve relevance of a search result(s) provided to a user(s).

A profile may be associated with a request using various methods. A profile may be associated with a request automatically and/or using the assistance of a guide(s), who may associate a keyword(s), category(ies), and/or other information with the request. A profile may be associated with a request based on an action(s) of a user.

A rating of a guide and/or other information associated with a profile associated with a request may be determined. A rating of a guide and/or other information based on other information such as a keyword(s), a category(ies) and/or information associated with a query may be determined. A rating of a guide associated with a profile may affect the probability that the guide will be selected to respond to a query associated with the profile.

If a query is submitted to the search system which does not utilize or request the assistance of a guide, the ranking of an item(s) provided responsive to the query may be affected by a rating of the item(s) associated with a profile associated with the query. For example, a ranking of a search result(s), an advertisement(s), a search resource(s) or other information may be modified based on a rating associated with a profile of a query. Information of an item(s) may be presented to a user based at least in part on a ranking of the item(s) based on a profile associated with a request, also referred to as a search request, a query or a search query. If a query submitted to the search system utilizes the assistance of a human searcher, also referred to as a guide or human assistant or searcher, information of item(s) may be presented to a guide based at least in part on a ranking of the item(s) based on a profile which may be associated with the query and/or the guide.

A profile may include but is not limited to demographic, geographic, personality, interest area, or other information which may be associated with a person. Demographic information may include but is not limited to information such as age, gender, race, date of birth, religion, income, political affiliation, education, weight, height, etc, Geographic information may include any information which may be associated with a location such as a street address, a zip code, an IP address, an area code, a place name, GPS or other coordinates, etc. Personality information may include information based on polling, testing, personality evaluations, personal preferences, etc. Interest area information may include hobbies, preferences in music, food, or other topics, a company, an organization, a person, etc. Any characteristic(s) of a person may be included in a profile.

A database is maintained which may include profile information associated with a guide(s), a user(s), a resource(s), an advertisement(s), a search result(s), and/or other information. A profile may or may not be associated with a specific person.

Information indicated in a profile may be obtained using various methods. For example, profile information may be obtained based on processing of a document(s), a web page(s), a database(s), or any other resource which may be processed in order to obtain information relating to a person. Similarly, profile information may be obtained based on an activity(ies) such as a test, a poll, a survey, a game, a search session, a training session, etc. which may be used to obtain information regarding a person. A method for obtaining profile information is further described in the related U.S. Application Ser. No. 60/980,010 previously mentioned. Any method(s) of obtaining profile information may be used within the scope and spirit of the embodiments disclosed herein.

The search system may allow a user(s) to communicate with a guide(s) without revealing personally identifying information associated with the user(s) and/or the guide(s). A profile associated with a query may allow a user(s) to communicate with a guide(s) who may match the profile(s) associated with the query without revealing personally identifying information of the user and/or the guide(s).

A profile may be associated with a search request and/or other information based on historical information. For example, an automated and/or human-assisted analysis of a search history associated with a user(s) may be used to select profile information which may be associated with the user(s) and/or a search request associated with the user, or a profile may be associated with an advertisement(s) based on a profile(s) associated with a person(s) who have expressed an opinion regarding the advertisement(s).

The search system may provide a resource(s) and/or other information based on a rating(s) associated with a profile. For example, a search resource(s) may be provided to a guide(s) responsive to a search request associated with a profile based at least in part on a rating(s) of the search resource(s) associated with the profile, or a user may be provided with an advertisement(s) in an order based at least in part on a rating(s) associated with a profile.

In at least one embodiment, a system 100 is provided. As illustrated in FIG. 1, system 100 includes guide system(s) 105, 110, a network 115 such as the Internet, a search system 130, user system(s) or information seeker system(s) 135, 140, a database 120, which may comprise various records, resource system(s) 145, 150 and resource(s) 155.

While only a limited number of systems associated with a guide (also referred to as a human searcher), resource (also referred to as a search resource), user (also referred to as an information seeker or requester) and a search system are depicted in FIG. 1, it is within the scope of the disclosure for multiple systems for guide, resource, information seeker and search systems to be utilized.

Any system (e.g., the user systems 135, 140) can be operated by an information seeker, who may be a person, to submit a search request to the search system 130 and/or receive a search result(s) and/or other information. Any guide system (e.g., the guide systems 105, 110) can be operated by a human searcher to obtain a search result(s) for an information seeker utilizing a user system (e.g., the user systems 135, 140). Any resource system (e.g., the resource systems 145, 150) may be operated by a human provider of information and/or may be an automated system which may provide a search result(s) and/or other information to a guide and/or a user, such as a search engine, a database, a local information source of a guide system such as a disk or removable memory, etc. A resource may not be accessible using the network 115. For example, a resource such as the resource 155 may be accessible to a guide operating a guide system such as the guide system 105. A resource might include printed materials, images, video, and/or audio information, a software application(s), any information accessible to a guide(s), a database(s), and/or any combination thereof.

The network 115 (FIG. 1) may be a global public network of networks (the Internet) and/or consist in whole or in part of one or more private networks and communicatively couples the guide systems, the resource systems and the user systems with the other components of the system such as the search system 130, and the database 120.

The search system 130 allows interaction to occur among the guide systems 105, 110, the resource systems 145, 150 and the user systems 135, 140. For example, an information search query(ies) can be transmitted from the user systems 135, 140 to the search system 130, where a search query(ies) can be accessed by the guide systems 105, 110 and/or the resource systems 145, 150. Similarly, a search result(s) produced from the resource systems 145, 150 using the guide systems 105, 110 in response to a search query(ies) submitted by the user systems 135, 140 may be transmitted to the search system 130, where it may be stored by the search system 130 and/or may be transmitted to the user systems 135, 140.

The search system 130 is communicatively coupled with the database 120. As will be described herein in further detail below, the database 120 includes data that is processed in association with operation(s) of the embodiments. Although FIG. 1 illustrates the database 120 as a separate component of the system, the database 120 may be integrated with the search system 130. Further, the records maintained in the database 120 may be stored in any typical manner, including in a Network Attached Storage (NAS), a Storage Area Network (SAN), etc. using any typical or proprietary database software such as DB2®, Informix®, Microsoft® SQLServer™, MySQL®, Oracle®, etc., and may also be a distributed database on more than one server. Elements of the database 120 may reside in any suitable elements of the system 100.

The user systems 135, 140, the guide systems 105, 110, the search system 130 and the resource systems 145, 150 may include equipment and personnel required to send and/or receive messages between a user system, a guide system, a resource system and/or the search system using the network 115. For example, a guide system(s) may be utilized for speech-to-text transcription, a user system may include text-to-speech conversion capabilities, or automated conversion of text to speech or speech to text may be performed. The database 120 includes information which may allow the search system 130 to establish communication between the other elements of the system.

A user system, a guide system, and/or a resource system may be a desktop or laptop PC or Mac®, a mobile phone, a smart phone, a PDA, a server system, a landline phone, a specialized communication terminal, a terminal connected to a mainframe, or any other communication device. The search system 130 may include one or more servers, computers, etc. After being presented with the disclosure herein, one of ordinary skill in the relevant art will immediately realize that any viable computer system(s) or communication device(s) known in the art may be used as user systems, guide systems, resource systems, and/or to implement the search system 130.

A guide may be required to register with the search system 130. As part of a registration process, at least one communication method is associated with a guide. In at least one embodiment, a guide may register with the search system 130 and establish a username (or other identifier) and password (authentication information) which are associated with the guide. A guide may login to the search system 130 using a web browser functionality of a guide system 105, 110 in order to communicate with the search system 130. Multiple communication services may be associated with a guide and may allow a communication session to be established between a guide system such as the guide system 105 and a user system, a resource system and/or the search system 130. Multiple identifiers of a guide may be associated with each other. Information such as IM credential(s), an email addressees), a phone number(s), a URL, a username, etc. of a guide may be identified which may allow the search system 130 to establish a communication session between a guide system and a user system, a resource system, and/or the search system 130.

When a guide registers with the search system 130 the guide may be associated with one or more keywords, categories, and/or other information. For example, a keyword(s) or category(ies) may be selected by a guide, or may be associated with a guide based on a test(s) administered to a guide and/or other information provided during and/or after a registration process. Information associated with a guide may be stored in the database 120 and/or may be used for purposes such as matching a guide to a user request, determining and/or providing compensation for a guide, communicating with a guide, etc., as will be described further herein below.

A user may be identified by the search system 130. When a user system such as the user system 135 establishes a communication session with the search system 130, an identifier of a user system is determined. An identifier of a user system may be associated with other information regarding a user. A user system may be identified using an email address, a telephone number, an IM credential, a username, or other identifier which may be used to associate information with a user. Multiple identifiers of a user may be associated with each other. Using information of communication services and/or devices associated with a user, a communication session may be established between a user system such as the user system 135 and a guide system, a resource system and/or the search system 130. Information such as a keyword(s), a category(ies), a user profile(s), a previous search request(s), a search result(s), etc. may be associated with a user. Information of a user may be stored in the database 120.

A resource system, which may be a person(s), an entity(ies), a search engine, a database, a software application, a corpus of one or more types of media such as text or printed information, images, audio, video, etc. or a combination thereof, may be identified by the search system 130 and/or a guide. Information of at least one method of communication is associated with a resource system which allows a communication session to be established between the search system 130, a user system 135, 140, and/or a guide system 105, 110 and a resource system such as the resource systems 145, 150. An identifier of a resource system may be associated with other information regarding a resource. A resource system may be identified using an email address, a telephone number, an IM credential, a resource username, a URL or other persistent identifier which may be used to associate information with a resource. Multiple identifiers of a resource may be associated with each other. Using the information of communication services associated with a resource, a communication session may be established between a resource system such as the resource system 145 and a user system, a guide system, and/or the search system 130. Information such as a keyword(s), a category(ies), a profile(s), or other information may be associated with a resource. Information of a resource may be stored in the database 120.

A resource such as the resource 155 and/or resources accessible via the resource systems 145, 150 may include any system(s), software, hardware, personnel and/or other facility(ies) which may provide information to a guide(s), a user(s), and/or the search system 130. For example, a resource may be a search engine, a database system, a library, a personal hard drive and/or other local storage, printed materials, recordings of any sort, a software program(s), a person or person(s), an organization, etc. A resource may be freely accessible to any user(s) and/or guide(s) and/or may be available on a restricted basis. The resource system(s) 145, 150 may include resource(s) which are available on an unrestricted and/or restricted basis. A resource may not be accessible using the network 115, but may be accessible to a guide(s). For example, a resource such as the resource 155 may be accessible to one or more guide(s) operating a guide system(s) such as the guide system 105 using any type of communication. For example, a guide(s) may obtain information of an event(s) to provide a search result(s). Information in any form, such as printed media, audio and/or visual information, software, hardware, etc. which may be accessible to a guide(s), a user(s) and/or an operator(s) of a private database system(s) may be a resource.

The search system 130 may be able to establish a communication session between any user system(s), guide system(s), or provider system(s) using information indicated in the database 120. For example, the user system 135 may establish a voice communication session with the search system 130, and subsequently the search system 130 may establish a voice communication session between the user system 135 and the guide system 105, and subsequently the search system 130 may establish a voice communication session between the user system 135 and the resource system 145. While a voice communication session is used in this example, any type of communication session using one or more services such as SMS, EMS, MMS, email, IM, chat, web based communication, etc. may be established between any user system(s), guide system(s), and/or resource system(s) and/or the search system 130 using the network 115.

Information associated with a user(s), a guide(s) and/or a resource(s) may be obtained in various ways. For example, a registration process may be performed using a web form(s) provided by the search system 130, and/or information may be obtained from an external database, and/or information may be obtained based on analysis of information indicated by a user, a guide, and/or a resource.

In the disclosed system and method a guide(s) or searcher(s) may be required to register with the search system 130, and in certain embodiments undergo training prior to being permitted to provide responses to queries submitted by an information seeker(s) or user(s) utilizing the search system. In one embodiment, a prospective guide or searcher must be invited to register as a searcher with the search system 130. In such a system, a previously registered searcher or an affiliate group may initiate the invitation process and thereby be designated as a sponsor for the invited searcher. In one embodiment of the disclosed system and method, a prospective guide is sent an email invitation to register as a guide or searcher with the search system. The email invitation in one embodiment contains a link to a guide registration page and some indicia, recognizable by the search system, as to the person or entity that invited a prospective guide to register so that upon registration the person or entity may be accredited with sponsorship of the invited guide.

Should a prospective guide elect to register as a guide with the search system, the prospective guide may for example initiate a registration process by clicking on a link that directs the guide's web browser to a URL of a guide registration page generated by a web server function of the search system 130. The search system may generate a registration web page designed and configured to allow a prospective provider to enter information for registration as a guide with the search system, as will be described herein below.

A user may be requested to provide a set of identifying information such as a user ID, and a login password. A user may be requested to provide additional information, as a condition for accessing services provided by the search system 130 (FIG. 1). Profile information associated with the user may be associated with the unique identifier assigned to the user login ID. In at least one embodiment, a phone number associated with a user is the unique identifier of the user.

Figure 2:
FIG. 2 illustrates a graphical user interface (GUI) for user registration.

An exemplary GUI 200 for registration with the search system 130 (FIG. 1) is illustrated in FIG. 2.

The GUI 200 may include a user login window 203, user login controls 205, a login button 210, a password recovery control 215, a user sign up window 217, name entry boxes 220, an email entry box 225, password selection controls 230, a phone number entry box 235, a cell phone provider selection control 240, a location services selection box 245, and a sign up control 250.

The 'email' user login control 205*a* may be used to enter an email address associated with a user account with the search system 130. The 'password' user login control 205*b* may be used to enter a password associated with a user account. The 'remember me' user login control 205*c* may be used to cause a user password to be retained for future visits to the registration page. The login button 210 may be used to submit the information indicated in the user login controls 205 to the search system 130 (FIG. 1). The password recovery control 215 may be used to recover a forgotten password.

The user sign up window 217 may be used to register a user with the search system 130 (FIG. 1). The 'First Name' name entry box 220*a* may be used to indicate a first name of a user. The 'Last Name' name entry box 220*b* may be used to indicate a last name of a user. The email entry box 225 may be used to indicate an email address to be associated with a user account. The 'Password' password selection control 230*a* may be used to enter a requested password to be associated with a user account. The 'Confirm Password' password selection control 230*b* may be used to confirm a requested password. The phone number entry box 235 may be used to enter a 10-digit phone number. The cell phone provider selection control 240 may be used to select a phone service provider associated with a phone number indicated in the phone number entry box 235. The location services selection box 245 may be used to indicate whether a user elects to allow location services associated with a user device to be enabled. The sign up control 250 may be used to submit information indicated in the user sign up window 217 to the search system 130 (FIG. 1).

Figure 3A:
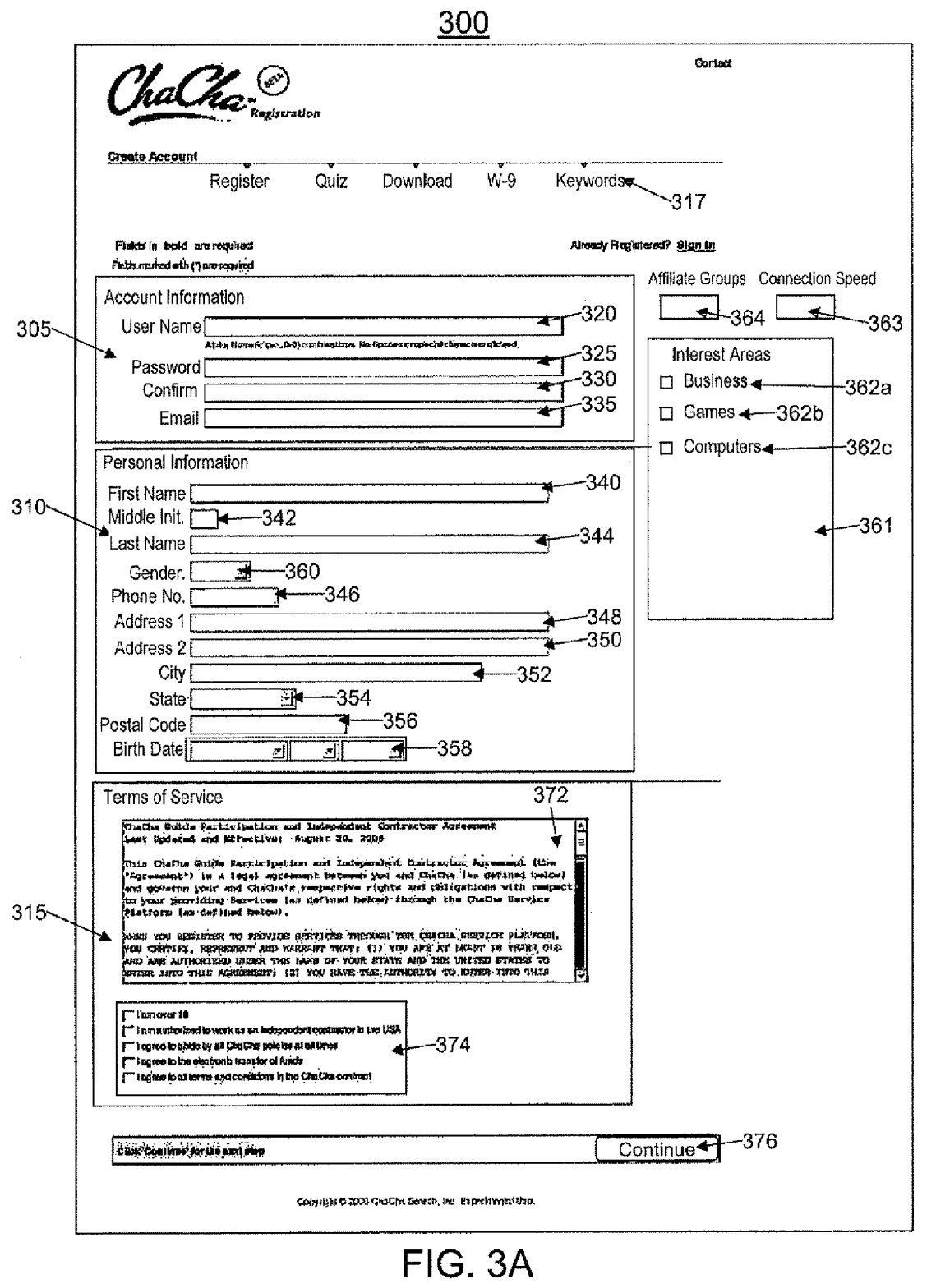
Figure 3B:
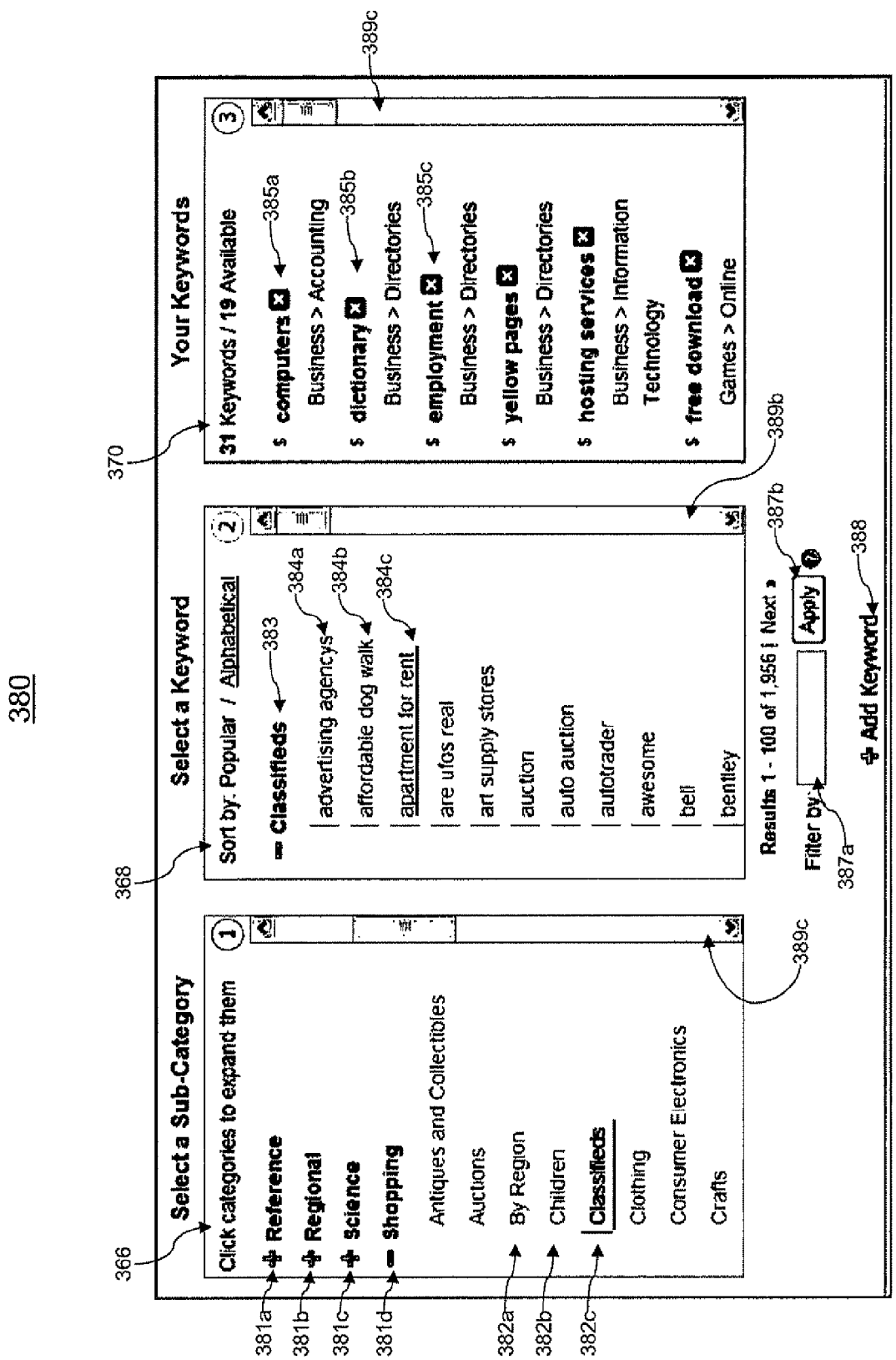

In the case of a guide, profile information may be required by the search system 130 as part of a registration process. An exemplary guide registration GUI is illustrated in FIGS. 3A-3B.

FIG. 3A illustrates an example of a searcher or guide registration page 300 designed and configured to allow a prospective guide to enter information for registration as a guide with the search system 130 (FIG. 1). As illustrated in FIG. 3A the registration page 300 may be divided into the account information section 305, the personal information section 310 and the terms of service section 315. The account information section 305 and the personal information section 310 each may include a plurality of text boxes and/or drop-down lists for entry of data associated with a guide. A user identification (ID) text box 320 is provided for input of user ID information regarding a searcher. The user ID text box 320 may be automatically populated with a standardized form of user ID by utilizing data input in the personal information section 310. The content of the user ID text box 320 may for example, be automatically generated by selecting the text string entered in the first name text box 340 and the first letter of the text string entered in the last name text box 344 and appending a text string to differentiate the user ID from existing user IDs.

The password text box 325 may be used to provide a desired password. The password confirmation text box 330 may be used to confirm the password provided in the password text box 325. The email text box 335 may be used to provide an email address for a prospective guide.

The first name text box 340 may be used to provide first name information, the middle initial text box 342 may be used to provide middle initial information, and the last name text box 344 may be used to indicate last name information of a prospective searcher. The phone number text box 346 may be used to provide a phone number of a prospective guide. Preferably the phone number text box 346 requires entry of a ten-digit number including area code. Information provided using the phone number text box 346 may be used to determine a geographic location of a guide. The address text boxes 348, 350, may be used to provide address information. The city text box 352 may be used to provide city information. The state indicator 354 which may be a text box or preferably a drop-down list may be used to indicate state information of a prospective guide. The postal code text box 356 may be used to indicate a postal code. Address information provided in the GUI 300 may also be utilized to establish a geographic location for a guide. The date of birth indicator 358 which may be a text box or preferably a drop-down list(s) may be used to provide date of birth information. The gender indicator 360 may be used to indicate gender information.

The registration page 300 may include one or more affiliation selection list(s) 364 populated with a list of available affiliate groups to permit a prospective guide to indicate affiliate groups with which he or she may be associated. In at least one embodiment, an affiliate group may elect to provide a search box on an affiliate group web page so that queries presented via the web page may be directed, if possible, to members of the affiliate group, in which case, the registration page provided to a prospective searcher may pre-populate the affiliation selection list(s) 364 with the name of a sponsoring affiliate group. In at least one embodiment, a prospective searcher is not permitted to indicate affiliation with one or more groups when directed to a registration page via an email invitation generated by an affiliate group request. In other embodiments, a prospective searcher may be able to select one or more affiliate groups in which he or she may be a member. Upon indicating membership in an affiliate group, the search system 130 (FIG. 1) may require verification information to validate a prospective searcher's membership in a selected affiliate group. Such information may include a user ID and/or a user password for an affiliate group. Any type of membership authentication information may be requested within the scope of the disclosure herein.

The registration page 300 may include the areas of interest selection window 361. A prospective searcher may indicate interest areas by activating an interest selection control 362 in the areas of interest selection window 363. For example, activation of the 'Business' interest selection control 362*a*, which may be indicated by a 'check mark', may be used by a searcher to identify 'Business' as an interest area. Likewise the interest selection controls 362*b* and 362*c* may be used to indicate interest in 'Games' and 'Computers', respectively. The selections made using the areas of interest check boxes 362 may be recorded in a profile of the searcher. The internet connection speed text box 363 which may a text box or preferably a drop-down list may be used to indicate a type of internet connection speed.

Prospective searchers may register with the search system 130 to accept search requests based on categories and/or keywords associated with a query. In at least one embodiment, selecting the 'Keywords' control 317 in the registration page 300 may cause the GUI 380 illustrated in FIG. 33, to be provided.

The terms of service section 315 (FIG. 3A) may include the terms of service window 372 which may allow a prospective guide to view information of a service agreement for a guide. The consent check boxes 374 may be used to indicate assent to terms required for the service agreement indicated in the terms of service window 372. The 'Continue' control 376 may be used to submit information provided using the registration page 300 to the search system 130 (FIG. 1). The search system 130 may extract information from the registration page 300 and may store such data in the search database 120 (FIG. 1). Any information such as telephone number, address, gender, date of birth, affiliate group, areas of interest, etc. obtained in a registration process may be recorded in a profile of a guide which may be used to match a guide to a request.

While the registration web page 300 requests the information described, it is within the scope of this disclosure for any information to be requested in order to register as a searcher with the search system. One of ordinary skill in the relevant art will immediately recognize that while, text boxes, drop-down lists and check boxes are illustrated as being generated on the registration page 300 (FIG. 3A) to facilitate acquisition of required information from the searcher, other equivalent data input controls which are well known in the relevant art may be utilized. Information such as ethnicity, religious affiliation, institutes of higher learning attended, degrees earned, areas of study, etc. may be requested by the search system 130 and may be stored in a profile of a searcher(s). It is also within the scope of this disclosure for the information requested for registration as a searcher to be acquired in other ways such as by accessing cookies and/or information stored on a guide or user system, via a database dump from an affiliate group database, etc. Likewise the search system 130 may request that a guide identify any type(s) of information and/or resource(s) which may be used to obtain profile information. Information of a searcher may be obtained using various types of activities. For example, testing, polling, game-playing or other activities might be provided to a guide. Any or all information acquired regarding a searcher(s) may be recorded in the search database 120 (FIG. 1).

A GUI 380 for selection of keywords and categories is illustrated in FIG. 3B. The GUI 380 may be used to select a number of categories and keywords. The GUI 380 includes the taxonomy selection window 366, the keyword selection window 368, and the current keywords window 370. The taxonomy selection window 366 may include information regarding a taxonomy which is used to select a guide and/or other information. The category indicators 381 may indicate a category which may include one or more sub-categories. The 'Reference' category indicator 381a may be used to select keywords and subcategories associated with the category 'Reference', the 'Regional' category indicator 381b may be used to select keywords and subcategories associated with the category 'Regional', the 'Science' category indicator 381c may be used to select keywords and subcategories associated with the category 'Science', the 'Shopping' category indicator 381d may be used to select keywords and subcategories associated with the category 'Shopping'. Activating a category indicator 381 may cause the subcategory indicators 382 associated with the category to be provided. Using the example in FIG. 3B, the 'Shopping' category indicator 381d is activated as indicated by the '-' indicator, and the subcategory indicators 382 associated with 'Shopping' are provided. The subcategory indicators 382 may be used to provide information regarding keywords associated with a subcategory and category in the keyword selection window 368. Activation of the 'By Region' subcategory indicator 382a may cause keywords associated with the subcategory 'Shopping>By Region' to be provided in the keyword selection window 368, activation of the 'Children' subcategory indicator 382b may cause keywords associated with the subcategory 'Shopping>Children' to be provided in the keyword selection window 368, and activation of the 'Classifieds' subcategory indicator 382c may cause keywords associated with the subcategory 'Shopping>Classifieds' to be provided in the keyword selection window 368. As illustrated by the underline indicator in FIG. 3, the 'Classifieds' subcategory indicator 382c is selected. The navigation controls 389a may be used to navigate within the subcategory selection window 366.

The keyword selection window 368 may include information regarding a number of keywords for which a guide may elect to accept searches. The subcategory control 383 may be presented based on a subcategory selected using the subcategory indicators 382. More than one subcategory control may be presented in the keyword selection window 368. Activation of a subcategory control 383 may cause the keyword indicators 384 to be provided. For example clicking on the 'Classifieds' subcategory control 383 may toggle between the keyword selection controls 384 being displayed and being hidden. The keyword selection controls 384 may be used to identify a keyword which is to be added to a list of keywords associated with a searcher. Activation of the 'advertising agencys' keyword selection control 384a may transfer the keyword 'advertising agencys' in the categorization 'Shopping>Classifieds' to be added to the current keywords window 370. Likewise the 'affordable dog walk' keyword indicator 384b and the 'apartment for rent' keyword indicator 384c may be used to transfer the respective categorized keywords to the current keywords window 370. Selection of a keyword selection control 384 may be indicated by for example the underline indication on the 'apartment for rent' keyword selection control 384c. The navigation controls 389b may be used to navigate within the subcategory selection window 368.

The current keywords window 370 may include information of keywords currently associated with a searcher. The current keyword indicators 385 may be used to indicate the status of a keyword and category associated with a searcher. A keyword may be removed from association with a searcher using the current keyword indicators 385. For example, the 'x' control associated with a current keyword indicator 385 may be activated to remove the keyword from the list of keywords for which a searcher will accept searches. A current keyword indicator 385 may include information of a category and subcategory associated with a keyword. The current keyword indicator 385a indicates that the searcher is associated with the keyword 'computers' and the category 'Business>Accounting', the current keyword indicator 385b indicates that the searcher is associated with the keyword 'dictionary' and the category 'Business>Directories', and the current keyword indicator 385c indicates that the searcher is associated with the keyword 'employment' and the category 'Business>Directories'. The navigation controls 389c may be used to navigate within the current keywords window 370.

The sorting controls 390 may be used to change the sorting criteria for keywords displayed in the keyword selection window 368. Activation of the 'Alphabetic' sorting control 390*a* as indicated by the underline may cause the keywords to be presented in alphabetic order in the keyword selection window. Activation of the 'Popular' control 390*b* may cause the keywords to be presented in order of most frequent occurrence in search requests. The filter controls 387 may be used to filter the keywords presented in the keyword selection window 368. A word or phrase may be entered in the selection box 387*a*, and activation of the 'Apply' button 387*b* may cause only keywords including the word or phrase to be indicated in the keywords selection window 368. Activation of the 'Add Keyword' control 388 may cause a keyword selected using a keyword indicator 384 to be added to the current keywords window 370, and a list of keywords associated with a searcher. For example if the 'apartment for rent' keyword indicator 384*c* is selected as indicated by the underlining, clicking on the 'Add keyword' control 388 may transfer the selected keyword to the current keywords window 370.

Information acquired using the GUI 380 may be recorded in the search database 120 (FIG. 1) and may be used to select a guide based on the keywords and/or categories associated with the guide.

As illustrated in FIG. 4, an exemplary searcher profile record 400 of which one or more may be associated with or resident in the search system database 120 (FIG. 1) is provided. The searcher profile record 400 may comprise a searcher profile identifier (ID) field 405, a profile searcher ID field 410, a searcher demographic profile field 415, a searcher geographic profile field 420, a searcher personality profile field 425, and a searcher interest area profile field 430.

The searcher profile ID field 405 contains an identifier of the searcher profile record 400. The searcher profile ID is preferably unique and is used consistently to identify a searcher profile. The searcher profile ID field 405 may contain text and/or numeric information and may contain information based on a random number. The searcher profile ID field 405 serves to distinguish the searcher profile record 400 associated with one searcher profile from those associated with other searcher profiles.

The profile searcher ID field 410 contains information of a searcher associated with the searcher profile record 400. The profile searcher ID field 410 may be used to look up profile information associated with a searcher. Any number of searcher profile records may be associated with a searcher ID. Using the example in FIG. 4, the searcher (guide) 'Paula Jones' is associated with the profile 'Searcher profile1'. In at least one embodiment, multiple searchers may be associated with a searcher profile. For example, ratings and/or rankings of a searcher(s) associated with content of a profile may be linked with a searcher ID indicated in the profile searcher ID field 410.

The searcher demographic profile data field 415 includes demographic information of a searcher associated with the searcher profile record 400. The demographic information may include, but is not limited to age, date of birth, educational background, gender, ethnicity, religious affiliation, political affiliation, height, weight, body type, etc. that may be associated with a searcher.

The searcher geographic profile field 420 includes geographic location information of a searcher associated with the searcher profile record 400. The geographic information may include, but is not limited to street address, IP address, GPS location information, telephone number, previous addresses, work address, zip code, etc. that may be associated with a searcher.

The searcher personality profile field 425 includes information regarding personality characteristics of a guide or searcher associated with the searcher profile record 400. The information may include but is not limited to psychometric profile information, personal perspective data, etc. which may be associated with a searcher.

The searcher interest area profile field 430 includes information regarding interest areas for a searcher associated with the searcher profile record 400. The interest area information may include, but is not limited to topics of articles or other publications, self-expressed areas of interest, hobbies, affiliations with organizations or companies, membership in clubs, blogs, etc. which may be associated with a searcher by the search system. Exemplary profile data is presented in the example record illustrated in FIG. 4, but other information and additional fields may be utilized within the scope of the embodiments described herein.

As illustrated in FIG. 5, an exemplary user profile record 500 of which one or more may be associated with or resident in the search system database 120 (FIG. 1) is provided. The user profile record 500 may comprise a user profile identifier (ID) field 505, a profile user ID field 510, a user demographic profile field 515, a user geographic profile field 520, a user personality profile field 525, and a user interest area profile field 530.

The user profile ID field 505 contains an identifier of the user profile record 500. The user profile ID is preferably unique and is used consistently to identify a user profile. The user profile ID field 505 may contain text and/or numeric information and may contain information based on a random number. The user profile ID field 505 serves to distinguish the user profile record 500 associated with one user profile from those associated with other user profiles.

The profile user ID field 510 contains information of a user associated with the user profile record 500. The profile user ID field may be used to 'look up' profile information associated with a user. Any number of user profile records may be associated with a user ID. Using the example in FIG. 5, the user 'Bill 1023' is associated with the profile 'User profile1'. In at least one embodiment, multiple users may be associated with a user profile. For example, ratings and/or rankings of a user(s) associated with content of a user profile may be linked with a user ID indicated in the profile user ID field 410.

The user demographic profile field 515 includes demographic information of a user associated with the user profile record 500. The demographic information may include, but is not limited to age, date of birth, educational background, gender, ethnicity, religious affiliation, political affiliation, height, weight, body type, etc. that may be associated with a user.

The user geographic profile field 520 includes geographic information of a user associated with the user profile record 500. The geographic information may include, but is not limited to street address, IP address, GPS location information, telephone number, previous addresses, work address, zip code, etc. that may be associated with a user.

The user personality profile field 525 (FIG. 5) includes information regarding personality characteristics of a user associated with the user profile record 500. The information may include but is not limited to psychometric profile information, personal perspective data, etc., which may be associated with a user.

The user interest area profile field 530 includes information regarding interest areas of a user associated with the user profile record 500. The interest area information may include but is not limited to topics of articles or other publications, self-expressed areas of interest, hobbies, affiliations with organizations or companies, membership in clubs, etc. which may be associated with a user.

The searcher profile record 400 (FIG. 4) and the user profile record 500 (FIG. 5) may comprise other fields within the scope of the embodiments described herein. One of ordinary skill in the relevant art will immediately recognize that information of other characteristics of a guide and/or user may be included in a searcher and/or user profile to facilitate selection of users and/or guides and/or a search result(s) based on the content of a profile.

As illustrated in FIG. 6, a sample record of a parametric profile record 600 of which one or more may be associated with or resident in the search system database 120 (FIG. 1) includes information related to a parametric profile. A parametric profile may for example be used to select a guide(s) using information indicated in a searcher profile record(s) such as the searcher profile record 400 (FIG. 4) which is associated with a guide. The parametric profile record 600 (FIG. 6) may comprise a parametric profile identification (ID) field 605, a user ID field 610, a parameter ID field 615, a parametric value field 620, a searcher ID field 625, and a searcher ratings field 630.

The parametric profile ID field 605 includes an identifier of the parametric profile record 600. The parametric profile ID is preferably unique and is used consistently to identify a parametric profile record. The parametric profile ID field 605 may contain text and/or numeric information and may contain information based on a random number. The parametric profile ID field serves to distinguish the parametric profile record 600 associated with one parametric profile from those associated with other parametric profile records. Multiple parametric profile records may be comprised in the search system database 120 (FIG. 1). Multiple parametric profile records may be associated with a user(s).

The user ID field 610 includes information of a user ID(s) associated with the parametric profile record 600. The user ID field 610 information may be used to identify a user(s) associated with the parametric profile record 600. Using this association, the search system 130 (FIG. 1) may identify the parametric profile records which are associated with a user ID. Using the example illustrated in FIG. 6, the parametric profile record 600 is associated with the user ID 'Bill 1023', which is also associated with the user profile record 500 illustrated in FIG. 5.

The parameter ID field 615 includes information regarding the information within a searcher profile record(s) which is associated with the parametric profile record 600. The parametric value field 620 includes information of the information to be matched in a field indicated by the parameter ID field 615 in a searcher profile record 400 (FIG. 4). The parameter ID field 615 (FIG. 6) may for example, indicate one or more fields in a searcher profile record which may contain information which is to be compared to the information indicated in the parametric value field 620 of a parametric profile record 600. Using the example illustrated in FIG. 6, the parameter ID field 615 indicates that data included in the searcher demographic information field of a searcher profile record is to be used to match the values 'Female' and 'DOB<1 Jan. 1980' as indicated in the parametric value field 620. Using the same example, the information in the searcher geographic location field may be examined to determine if a searcher profile record associated with a guide indicates that a guide has lived in 'Fishers IN' and the searcher interest area field data may be examined to determine if it matches 'Colts Fan'.

The searcher ID field 625 may contain information of a searcher associated with a parametric profile. Using the example illustrated in FIG. 6, the searchers 'Paula 1126', 'Sergei1 1000', and 'TomC 1023' are associated with the profile 'Bill 1023_Female'. In at least one embodiment, the searcher ID field 625 and the searcher ratings field 630 may be linked by for example a pointer.

The searcher ratings field 630 may contain information of a rating or ranking associated with a searcher and a profile. Continuing with the example illustrated in FIG. 6, the searcher 'Paula 1126' is rated '1' when associated with the profile 'Bill 1023_Female', likewise, the searcher 'Sergei1 1000' is rated '3' when associated with the profile 'Bill 1023_Female', and the searcher 'TomC 1023' is rated '2' when associated with the profile 'Bill 1023_Female'. A ranking or rating of a searcher associated with a profile may affect the probability that a searcher will be selected to respond to a query associated with a profile. Rating information associated with a profile may be determined based on any information associated with a searcher or a searcher profile. For example, if a searcher profile indicates that a guide is associated with a location in close proximity to a location indicated in a parametric profile, the searcher may have a high rating associated with the parametric profile, or if a guide profile indicates that a guide is associated with a date of birth which is not close to a date of birth indicated in a searcher profile, the guide may have a low rating associated with the searcher profile. A rating associated with a profile may be based on any or all information indicated in the profile.

While the parametric profile record 600 is illustrated using the specific example in FIGS. 4, 5 and 6, various ways of identifying information or data associated with a searcher profile and comparing it to information indicated in a profile associated with a query may be employed without departing from the scope and spirit of the embodiments disclosed herein.

While only a limited number of guides have been used for the purposes of simplicity in the example illustrated, no limitation is implied thereby any number of guides might be rated based on information indicated in a profile(s).

While the example of selection of a guide(s) has been used for the purposes of illustration, any item(s) which may be associated with a profile may be rated based on information indicated in a profile. For example, a user profile associated with a query might be compared to a profile associated with a search resource(s) in order to determine a rating(s) of a search resource(s) which might be provided to a guide responsive to the query, or a guide profile(s) might be compared to a profile associated with a training or polling activity to determine a rating(s) of the activity which might be presented to the guide if the guide is to be trained or polled.

Using a parametric profile such as parametric profile record 600 and searcher profile record(s) such as the searcher profile record 400 (FIG. 4) a group of searcher profile records may be selected. A selected group may include any number of searcher(s). The information indicated in a group of searcher profile records may be used to identify a group of registered guides associated with the searcher profile record(s). Likewise, a rating(s) of any item(s) associated with a profile such as a search result(s), an advertisement(s), a search resource(s), etc. may be determined based on a parametric profile and a profile associated with the item(s).

The searcher profile record 400 (FIG. 4), the user profile record 500 (FIG. 5) and the parametric profile record 600 (FIG. 6) may comprise other fields within the scope of the embodiments described herein. Further, information of characteristics of a guide and/or user may be included in fields of a searcher and/or user profile to facilitate selection of a user(s) and/or a guide(s), a resource(s) and/or a search result(s) based on the content of a profile record. Likewise, some fields of a profile record may be blank. A profile may be associated with any item(s), which may allow the search system 130 (FIG. 1) to select an item(s) based on a rating(s) associated with the profile associated with the item.

As illustrated in FIG. 7, a sample of a query record, of which one or more may be associated with or resident in the search database 120 (FIG. 1) is provided. The query record 700 may include a query identification (ID) field 705, a category(ies)/keyword(s) field 710, a results field 715, a user list field 720, a searcher list field 725, and a profile information field 730.

A query record 700 may be created and/or modified using, for example, a search session, an interactive training session, a non-interactive training session, may be obtained from a resource(s) accessible to the search system 130 (FIG. 1), may be obtained based on processing of electronic or other media, etc.

The query ID field 705 preferably contains a unique identifier of a query or search query or request, which is preferably used consistently. For example, in at least one embodiment, the query ID field 705 can include a randomly generated numerical code, and/or a text string indicating the content of a query. Further, other identifiers may be utilized without departing from the spirit and scope of the embodiments.

A unique identifier may be assigned to a query or search request when it is entered into the search database 120 (FIG. 1). If it is determined that a new search query is identical to an existing query in the search database, that query may be assigned the same query ID and may be added to a query record associated with the query ID. A query may include other information than that explicitly entered by the user/requester. For example, location information, profile information, etc. may be associated with a query which might differentiate the query from a query in the search database 120 (FIG. 1). In at least one embodiment, each search request received by the search system 130 (FIG. 1) may be assigned a unique identifier and a query record may be created responsive to a query. Using the example illustrated in FIG. 7, 'what is the best sports bar in Indianapolis' is the query ID for the query record 700.

The categories/keywords field 710 includes information of a category(ies) and/or keyword(s) associated with a query. The content of the categories/keywords field 710 may be generated by an automated analysis of a query and/or a human may select a category(ies) and/or keyword(s) which is associated with a query. A method for associating a query and a category and/or other information is further described in U.S. patent application Ser. No. 12/109,776 previously mentioned. For example, in the record illustrated in FIG. 7, the taxonomy branch or category 'Entertainment>Dining>Indianapolis' is associated with the query 'what is the best sports bar in Indianapolis', as a relevant search result(s) may be more likely to be found using search resources associated with that category. Likewise, the keywords 'sports bar' and 'indianapolis' are associated with the query 'what is the best sports bar in indianapolis'. Any number of categories and/or keywords may be associated with a query. While a keyword(s) and a category(ies) have been used for the purposes of illustration, other information which may be used to determine a rating(s) of an item(s) such as a search result(s), a search resource(s), an advertisement(s), etc. might be indicated in the categories/keywords field 710.

The results field 715 includes information of a search result(s) which are associated with a query. Using the example in FIG. 7, the search results 'www.colts_bar.com/downtown', 'www.bears_bar.com/indy' and 'www.colts_bar.com/fishers' are associated with the query 'what is the best sports bar in indianapolis?'. The results field 715 may contain rating information associated with one or more search result(s).

The user list field 720 includes information of a user(s) who may have submitted a query to the search system 130 (FIG. 1). The user list field 720 may be used to associate a user and/or a profile(s) with a query. As illustrated in FIG. 7, the users 'Bill 1023' and 'Janet 1007' are associated with the query 'what is the best sports bar in Indianapolis?'.

The searcher list field 725 includes information of a searcher(s) associated with a query. For example, a searcher(s) who produced a search result(s) responsive to a query may be associated with the search result. The content of the searcher list field 725 may for example be used to associate a searcher profile with a search result(s). A rating(s) associated with a search result(s) produced by a searcher may be used to determine compensation for a searcher(s). Continuing with the example illustrated in FIG. 7, the searcher ID 'TomC 1023' is associated with the search result 'www.colts_bar.com/downtown', the searcher ID 'Sergei 1000' is associated with the search result 'www.bears_bar.com/indy' and the searcher 'Paula 1126' is associated with the search result 'www.colts_bar.com/fishers'. In at least one embodiment, the results field 715 is linked with the searcher list field 725 by, for example, a pointer.

The profile information field 730 may include information of a profile associated with a query. Using the example illustrated in FIG. 7, the parametric profile 'Bill 1023_Female' has been associated with the query 'what is the best sports bar in indianapolis?' by the user 'Bill 1023' and the parametric profile 'Janet 1007_default' has been associated with the query 'what is the best sports bar in indianapolis?' by the user 'Janet 1007'. In at least one embodiment, the content of the user list field 720 and the profile information field 730 are linked by, for example, a pointer. The results field 715 and the profile information field 730 may be linked by, for example, a pointer.

Continuing with the example illustrated in FIG. 7, in the results field 715, the result 'www.colts_bar.com/downtown' is ranked first when no profile is associated with the query 'what is the best sports bar in indianapolis?', it is ranked second when the profile 'Bill1023_Female' is associated with the query, 'what is the best sports bar in Indianapolis?' and it is ranked third when the profile 'Janet1007_default' is associated with the query 'what is the best sports bar in Indianapolis?'. Likewise, the result 'www.bears_bar.com/indy' is ranked second when no profile is associated with the query 'what is the best sports bar in Indianapolis?', it is ranked third when the profile 'Bill1023_Female' is associated with the query, 'what is the best sports bar in indianapolis?' and it is ranked first when the profile 'Janet1007_default' is associated with the query 'what is the best sports bar in indianapolis?', and the result 'www.colts_bar.com/fishers' is ranked third when no profile is associated with the query 'what is the best sports bar in indianapolis?', it is ranked first when the profile 'Bill1023_Female' is associated with the query, 'what is the best sports bar in indianapolis?' and it is ranked second when the profile 'Janet1007_default' is associated with the query 'what is the best sports bar in indianapolis?'. As illustrated, a ranking or rating(s) of a search result(s) may be modified when a profile is associated with a query. The ranking of a search result associated with a search query may be based on various criteria. In at least one embodiment, the ranking is based on voting by guides and/or users and/or others associated with a profile. For example, the ranking of a search result associated with a search query may be based on ratings by a guide(s) that matches a profile associated with the search request. In at least one embodiment, the ranking of a search result is based on a ranking associated with a keyword(s) and/or category(ies) associated with a query. For example, the ranking of a search result may be based on ratings by users who are associated with a category(ies) and/or keyword(s) associated with the search request.

As illustrated in FIG. 8, a sample of a keyword record, of which one or more may be associated with or resident in the search database 120 (FIG. 1) is provided. The keyword record 800 may include a keyword identification (ID) field 805, a category ID field 810, a searcher ID field 815, a category rating field 820, and a searcher rating field 825.

A keyword record 800 may be created and/or modified in various ways. For example, a human guide may associate a keyword of a query submitted by a user with one or more categories, or a system administrator of the search system may associate a keyword with a number of categories. Likewise, a searcher may elect to be associated with a keyword(s) and/or category(ies). A keyword record(s) may be created and/or modified based on information obtained from an external database, based on information obtained by processing of electronic media, based on activities of a user(s) and/or a guide(s) which may for example affect a rating(s) of a category(ies) and/or a guide(s) associated with a keyword(s). Any number of categories may be associated with a keyword(s). Rating information associated with a category(ies) associated with a keyword may affect the probability that a category will be associated with a query which may include a keyword(s).

The keyword ID field 805 preferably contains a unique identifier of a keyword, which is preferably used consistently. For example, in at least one embodiment, the keyword ID field 805 can include a randomly generated numerical code, and/or a text string indicating the content of the keyword. Although particular examples of identifiers are described herein, various types of identifiers uniquely indicating a keyword(s) may be utilized without departing from the spirit and scope of the embodiments herein. A unique identifier may be assigned to a keyword when it is entered into the search database 120 (FIG. 1). Using the example in FIG. 8, 'Indianapolis' is the keyword ID associated with the keyword record 800. In at least one embodiment, the keyword ID is based on a combination of a keyword and a categorization associated with the keyword.

The category ID field 810 includes information of a category(ies) associated with a keyword. The content of the category ID field 810 may be generated automatically and/or a person may select a category(ies) which is associated with a keyword. Using the example illustrated in FIG. 8, the category 'Entertainment>Dining>Indianapolis' and the category 'Shopping>Electronics>Television' are associated with the keyword 'indianapolis'. In at least one embodiment, the category ID field 810 is linked to the category rating field 820 by for example a pointer.

The searcher ID field 815 includes information of a searcher or guide associated with a keyword and/or a category. Using the example in FIG. 8, the guides 'TomC 1023', 'Sergei1 1000', and 'Paula 1126' are associated with the keyword 'indianapolis'. The searcher ID field 815 may include rating information associated with one or more guides. In at least one embodiment, the searcher ID field 815 is linked to the searcher rating field 825 by for example a pointer.

The category rating field 820 includes information of a rating or ranking of a category associated with a keyword. The content of the category rating field 820 may be used to rank a category associated with a keyword. A category rating may be generated or modified in various ways. In at least one embodiment, a rating of a category associated with a keyword may be based on frequency of use of a categorization by a guide(s), and/or voting by a guide(s) and/or other rating information provided by actions of a user(s) and/or a guide(s). Using the example illustrated in FIG. 8, a ranking of '1' is associated with the category 'Entertainment>Dining>Indianapolis' and the keyword 'indianapolis' and a ranking of '2' is associated with the category 'Shopping>Electronics>Television' and the keyword 'Indianapolis'. This may indicate that the category 'Entertainment>Dining>Indianapolis' is more likely to be associated with the keyword 'indianapolis' than the category 'Shopping>Electronics>Television'. A rating of a category associated with a keyword may for example be used to associate a category with a query including the keyword.

The searcher rating field 825 includes information of rating or ranking associated with a searcher associated with a keyword. The information indicated in the searcher rating field 825 may be used to rank a searcher associated with a keyword. A searcher rating may be generated or modified using various methods. A rating of a searcher may be determined based on a rating of a search result(s) associated with a keyword. In at least one embodiment, a rating of a searcher associated with a keyword may be based on rating of a search result(s) produced by a guide for a query(ies) associated with a keyword. In at least one embodiment, a ranking of a search result may be based on a user rating(s) and/or voting by a guide(s) and/or other ratings associated with a keyword(s). Continuing with the example illustrated in FIG. 8, the guide 'TomC 1023' has a rating '1', the guide 'Sergei1 1000' has a rating '3', and the guide 'Paula 1126' has a rating '2' associated with the keyword 'indianapolis'. This may indicate that the guide 'TomC 1023' is the top ranked searcher, 'Paula 1126' is the second ranked searcher, and 'Sergei 1000' is the third ranked searcher associated with the keyword 'Indianapolis'. If a search request or query is associated with the keyword 'indianapolis', the searcher 'TomC 1023' may be more likely to be selected to respond to the query.

As illustrated in FIG. 9, a sample of a category record, of which one or more may be associated with or resident in the search database 120 (FIG. 1) is provided. The category record 900 may include a category identification (ID) field 905, a searcher ID field 910, and a searcher rating field 915.

A category record 900 may be created and/or modified in various ways. For example, a guide may associate a query with one or more categories, which may modify a searcher rating(s) associated with a category, or a searcher may elect to be associated with a category(ies). A category record(s) may be created and/or modified using information obtained from an external database, using information obtained by processing of electronic media, based on an activity such as training or searching by a guide associated with a category, etc.

The category ID field 905 preferably contains a unique identifier of a category, which is preferably used consistently. For example, in at least one embodiment, the category ID field 905 can include a randomly generated numerical code, and/or a text string indicating the content of the category or taxonomy branch. Although particular examples of identifiers are described herein, various types of identifiers uniquely indicating a category may be utilized without departing from the spirit and scope of the embodiments. A unique identifier may be assigned to a category when it is entered into the search database 120 (FIG. 1).

The searcher ID field 910 includes information of a searcher(s) associated with a category. Using the example illustrated in FIG. 9, the searchers 'TomC 1023', 'Sergei1 1000' and 'Paula 1126' are associated with the category 'Entertainment>Dining>Indianapolis'. In at least one embodiment, the searcher ID field 910 (FIG. 9) and the searcher rating field 915 are linked by for example a pointer.

The searcher rating field 915 includes information of a rating and/or ranking associated with a category and a guide. The content of the searcher rating field 915 may be used to rank a searcher(s) associated with a category. A searcher rating associated with a category may be generated and/or modified in various ways. In at least one embodiment, a rating(s) of a searcher associated with a category may be based on a rating(s) of a search result(s) produced by a guide for a query(ies) associated with a category and/or a keyword(s). In at least one embodiment, a ranking of a search result(s) may be based on a user rating(s) and/or voting by a guide(s) and/or other rating information. Any suitable method of rating and/or ranking a guide associated with a category may be utilized. Continuing with the example illustrated in FIG. 9, the guide 'TomC 1023' has a rating '3', the guide 'Sergei1 1000' has a rating '2', and the guide 'Paula 1126' has a rating '1' associated with the category 'Entertainment>Dining>Indianapolis'. This may indicate that the guide 'Paula 1126' is the top ranked searcher associated with the category 'Entertainment>Dining>Indianapolis'. If a search request or query is associated with the category 'Entertainment>Dining>Indianapolis', the searcher 'Paula 1126' may be more likely to be selected to handle the query. As illustrated herein above, the ranking and/or rating of a searcher, a search result and/or other item(s) may be different depending on information associated with the ranking(s) and/or rating(s) and a searcher(s) and/or a search result(s). Using the example above, the searcher(s) 'TomC 1023', 'Sergei1 1000', and 'Paula 1126' have a different ranking when associated with a profile (e.g. the profile 'Bill 1023_Female'), a keyword (e.g., the keyword 'indianapolis'), and a category (e.g., the category 'Entertainment>Dining>Indianapolis'). Rating or ranking of a guide(s) and/or a search result(s) and/or any other item such as an advertisement, a resource, etc. when associated with a query may be affected by any or all information associated with an item(s). Any information indicated in the search system database 120 (FIG. 1) may be used to determine a ranking(s) and/or rating(s).

A record such as the query record 700, the keyword record 800, and the category record 900 may comprise additional fields within the scope of the disclosure herein. For example, other item(s) such as an advertisement(s), a search resource(s), an interactive activity(ies), etc. may be identified in a query, keyword and/or category record and may have rating and/or ranking information associated with the item(s). Any information indicated in the search system database 120 may be included in a query record, a keyword record and/or the category record. The information contents illustrated in the query record 700, the keyword record 800, and the category record 900 are exemplary and no limitation is implied thereby. In addition, various ways of representing information may be utilized without departing from the spirit and scope of the embodiments disclosed herein.

Figure 10:
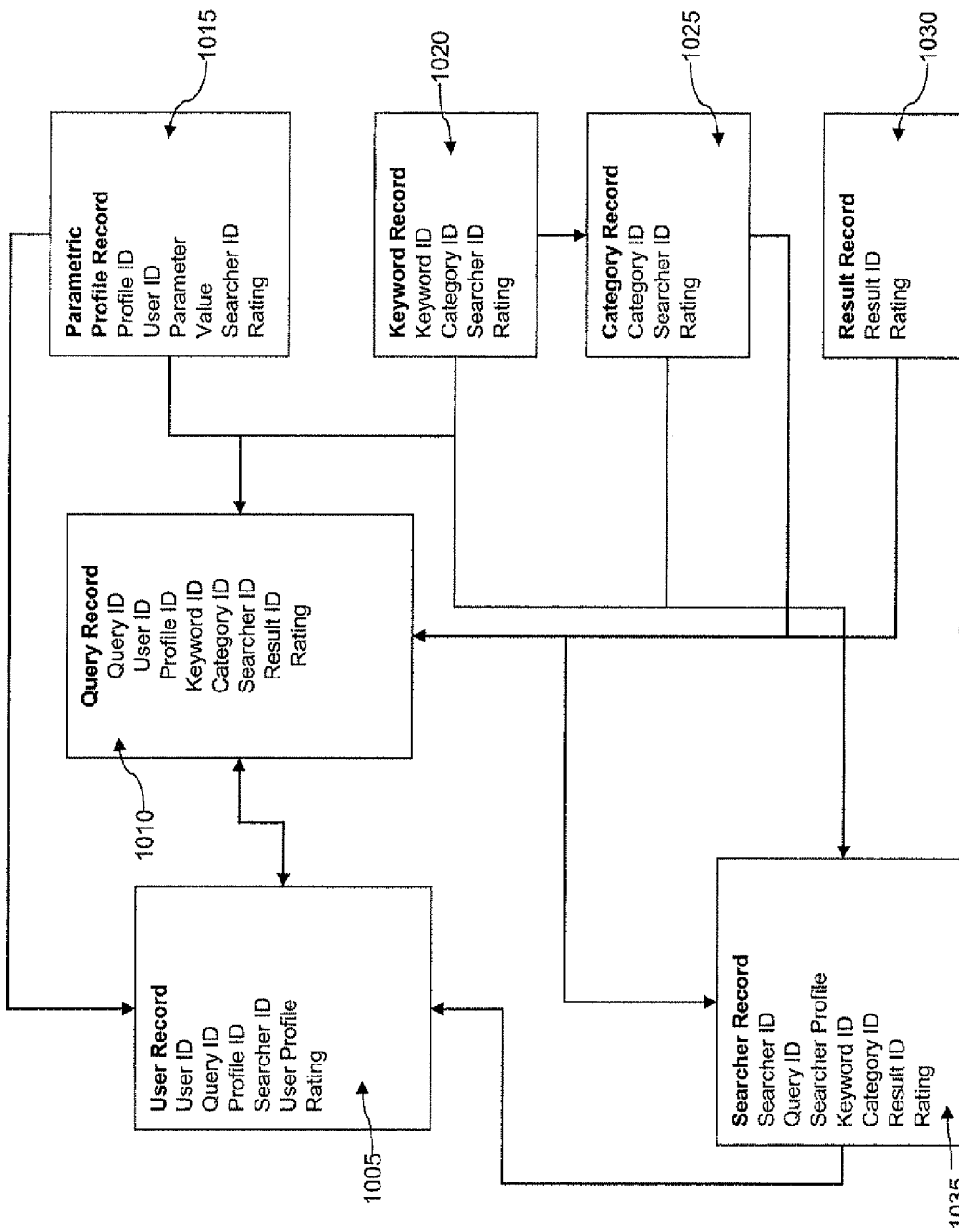
FIG. 10 is a simplified diagram illustrating a database relationship.

A database relationship of the information comprised in the search database 120 (FIG. 1) is illustrated in FIG. 10. The relationship is exemplary, and alternate embodiments of the relationships and data structures may be used within the scope of the disclosure herein.

The search system database 120 (FIG. 1) may comprise one or more of a user record 1005, a query record 1010, a parametric profile record 1015, a keyword record 1020, a category record 1025, a result record 1030 and/or a searcher record 1035.

The user record 1005 may include information of a user. The information included in the user record 1005 may indicate a query(ies), a profile(s), a searcher(s) and a rating(s) associated with a user. Information in a user record may be obtained in various ways. For example, an identifier(s) of a user may be obtained using the GUI 200 (FIG. 2), or information of queries associated with a user may be recorded by the search system 130 (FIG. 1). Information of a user profile and/or a parametric profile associated with a user may be obtained based on user actions, may be obtained from information provided by a device associated with a user (e.g., location based information, device characteristics, information provided by a service provider(s) associated with a user device(s), etc.), may be determined based on historical information associated with a user, may be determined by a guide(s), etc. In at least one embodiment, a user profile such as the user profile record 500 (FIG. 5) and/or a parametric profile such as the parametric profile 600 (FIG. 6) may be indicated in a user record. Information indicated in a user record may be used to establish communication with a user via any communication service(s) and/or device(s) associated with the user. Any information associated with a user may be indicated in a user record such as the user record 1005.

The query record 1010 (FIG. 10) may include information of a query. The information included in a query record 1010 may indicate a user(s), a profile(s), a keyword(s), a category(ies), a searcher(s), a result(s) and a rating(s) associated with a query. In at least one embodiment, a parametric profile such as the parametric profile 600 (FIG. 6), may be indicated in a query record. A query record may be used for various purposes. In at least one embodiment, information indicated in a query record may be used to determine a rating(s) and/or ranking(s) of a searcher(s), a search result(s) and/or other item(s) which may be selected responsive to a query or search request. In at least one embodiment, a rating(s) obtained from a user(s), a guide(s), and/or a system administrator(s) may be indicated in a query record.

The parametric profile record 1015 may include information of parametric profile, a user(s), a parameter(s), a value(s), a searcher(s), and a rating(s) associated with a profile as described herein with respect to FIG. 6. In at least one embodiment, if the profile ID associated with a parametric profile is indicated in a query record, a rating(s) and/or ranking(s) of an item(s) such as a searcher(s), an advertisement(s), a category(ies) and/or other information associated with the profile may be used at least in part to select an item(s) responsive to the search request as further explained herein below with respect to FIG. 11.

The keyword record 1020 may include information of a keyword, a category(ies) a searcher(s) and a rating(s) associated with a keyword as described herein with respect to FIG. 8. Information regarding other item(s) may be indicated in a keyword record. For example, an identifier and/or rating(s) of any number of items such as an advertisement(s), a resource(s), a search result(s), a training activity or material(s), etc. may be indicated in a keyword record.

The category record 1025 may include information of a category or taxonomy branch, a searcher(s) and a rating(s) associated with a category as described herein with respect to FIG. 9. Information regarding other item(s) may be indicated in a category record. For example, an identifier and/or rating(s) of any number of items such as an advertisement(s), a resource(s), a search result(s), a training activity or material(s), etc. may be indicated in a category record.

The result record 1030 may include information of a search result and/or a rating(s) associated with a result. For example, a URL, a guide comment, a snippet, a tag, access information, or any other information of a resource may be included in the result record 1030. Likewise, any rating information such as user rating(s), guide ratings(s), or any other ranking or rating information may be indicated in the result record 1030. Content of a message(s) provided responsive to search query may be indicated in a result record. In at least one embodiment, a result record may include a response to a query associated with a query record and a URL which identifies a resource which is associated with the response.

The searcher record 1035 may include information of a searcher, a query(ies), a keyword(s), a category(ies), a profile(s), a result(s), and/or a rating(s) or ranking(s) associated with a searcher. Information indicated in a user record may be used to establish communication with a user via any communication service(s) and/or device(s) associated with the user. Any information associated with a searcher may be indicated in a searcher record such as the searcher record 1005.

The relationships illustrated in FIG. 10 may be used in conjunction with and/or in addition to any other information included in the search database 120 (FIG. 1) to rank and select a searcher(s) and/or a search result(s) and/or other information associated with one or more of a query, a keyword, a category, a profile, etc., as will be further described herein below. Any of the records described herein may contain additional fields, and one or more of the fields may be blank.

Although the embodiments described herein are depicted with respect to the exemplary data structures illustrated in the figures, no limitation of scope is implied thereby. Alternate forms of the data structures and relationships which may be used to operate the embodiments are within the scope and spirit of this disclosure. Any number of records required to operate the embodiments may be utilized.

Figure 11:
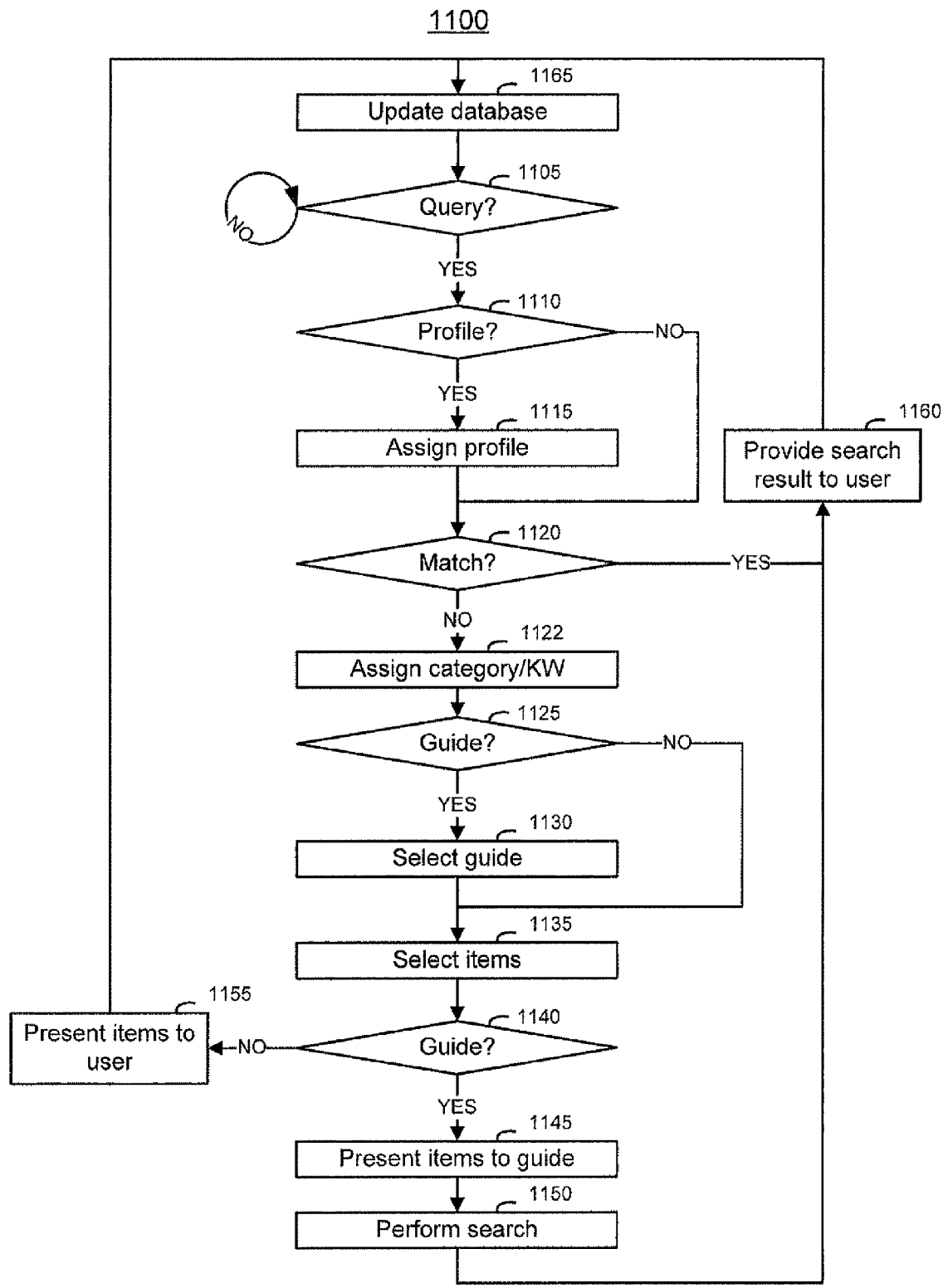
FIG. 11 is a flow diagram of a process for performing an information search.

As illustrated in FIG. 11, a process 1100 for performing an information search is provided.

In operation 1105, a determination is made as to whether a query is received. If it is determined in operation 1105 that a query is not received control remains at operation 1105 and method 1100 continues to wait. If it is determined in operation 1105 that a query is received control is passed to operation 1110 and process 1100 continues.

The determination in operation 1105 may be made based on various criteria. For example, if a search query is submitted via voice, SMS, EMS, MMS to a service provider, or an email is received at an email address, or if an Instant Message is received at a IM service account associated with the search system 130 (FIG. 1) or based on other suitable criteria it may be determined that a query has been received.

In operation 1110 a determination is made as to whether a profile is to be associated with a query. If it is determined in operation 1110 that a profile is not to be associated with a query, control is passed to operation 1120 and method 1100 continues. If it is determined in operation 1110 that a profile is to be associated with a query, control is passed to operation 1115 and process 1100 continues.

In operation 1115 a profile is associated with a query. A method for associating a profile with a query is further described herein with respect to FIG. 12. Control is passed to operation 1120 and process 1100 continues.

In operation 1120 a determination is made as to whether a query which matches the query is available. If it is determined in operation 1120 that a query which matches the query is available, control is passed to operation 1160 and method 1100 continues. If it is determined in operation 1120 that a query which matches the query is not available, control is passed to operation 1122 and method 1100 continues.

The determination in operation 1120 may be made based on various criteria. For example if a query exactly matches a query indicated in the search database 120 (FIG. 1) or if a query matches a query indicated in the search database 120 based on an approximate match criteria determined by the search system 130 it may be determined that a query which matches the query is available. In at least one embodiment, if a query and a profile associated with the query match a query and a profile associated with the query indicated in the search database 120, it may be determined that a query which matches the query is available.

In operation 1122 a keyword(s), category(ies) and/or other information not indicated in a profile(s) is associated with a query. A keyword(s), category(ies), tag(s), and/or other information may be associated with a query automatically and/or using the assistance of a guide(s). Control is passed to operation 1125 and process 1100 continues.

In operation 1125 a determination is made as to whether a guide is to be selected. If it is determined in operation 1125 that a guide is to be selected, control is passed to operation 1130 and method 1100 continues. If it is determined in operation 1125 that a guide is not to be selected, control is passed to operation 1135 and method 1100 continues.

The determination in operation 1125 may be made based on various criteria. In at least one embodiment, information associated with a request may be used to determine whether a guide is to be selected. For example a telephone number, short code, IM address, email address, a URL, etc. associated with a request may be used to determine whether a guide is to be selected. In at least one embodiment, status information regarding the system 100 may be used to determine whether a guide is to be selected. For example, availability, ranking, training needs, availability of a resource(s), information provided by a resource(s), etc. may be utilized to determine whether a guide is to be selected.

In operation 1130 a guide is selected. A method for selection of a guide based on a profile and/or other information associated with a query is further described herein below with respect to FIG. 14. Control is passed to operation 1135 and process 1100 continues.

In operation 1135 a number of items are selected based on information associated with the query. Items such as a search resource(s), a previous query(ies), an advertisement(s), etc. may be selected. A method for selection of a number of items is further described herein below with respect to FIG. 13. Control is passed to operation 1140 and method 1100 continues.

In operation 1140 a determination is made as to whether a guide is to perform a search. If it is determined in operation 1120 that a guide is to perform a search, control is passed to operation 1145 and method 1100 continues. If it is determined in operation 1120 that a guide is to not perform a search, control is passed to operation 1155 and process 1100 continues.

The determination in operation 1140 may be made based on various criteria. In at least one embodiment, the determination in operation 1140 is made based on user acceptance or rejection of a search result(s) which may be provided in operation 1160. In at least one embodiment it may be determined that a guide is to perform a search and that a guide is not to perform a search. For example, information of a search result(s) or result and/or other item(s) might be presented to a user and a guide(s) might perform a search.

In operation 1145 information of a number of items is presented to a guide. Items may be presented to a guide in an order based on a selection made in operation 1135. Information of items such as a search resource(s), a previous query(ies), an advertisement(s), etc. may be provided. Control is passed to operation 1150 and process 1100 continues.

In operation 1150 a search is performed. Any number of guides may perform a search. A guide(s) may transfer a search request to another guide. A search may be performed using any resource(s) which are available to a guide(s). A guide(s) may select any item(s) which may be provided as a result(s). Control is passed to operation 1160 and process 1100 continues.

In operation 1155 information of a number of items is presented to a user. Items may be presented to a user in an order based on a selection made in operation 1135. Information of items such as a search resource(s), a previous query(ies), an advertisement(s), etc. may be provided. Control is passed to operation 1165 and process 1100 continues.

In operation 1160 information of a search result(s) and/or item(s) is presented to a user. Items may be presented to a user in an order based on a selection made in operation 1135. Information of items such as a search resource(s), a previous query(ies), an advertisement(s), etc. may be provided. Control is passed to operation 1165 and process 1100 continues.

In operation 1165 the search database 120 (FIG. 1) is updated. Information of a user(s), a guide(s), a profile(s), a search result(s), a resource(s), an advertisement(s), and/or other item(s) may be recorded and/or updated. Rating information associated with any item(s) indicated in the search database may be modified. For example a rating of a searcher associated with a profile may be increased if a search result(s) is accepted by a user, or a rating of a resource or search resource associated with a query may be reduced if a guide selected a different resource in order to respond to a query. Information of a profile(s) associated with a user may be recorded. For example, if a guide associates a profile with a user, and a search result is accepted and/or utilized by the user a rating of the profile associated with the user may be increased.

Figure 12:
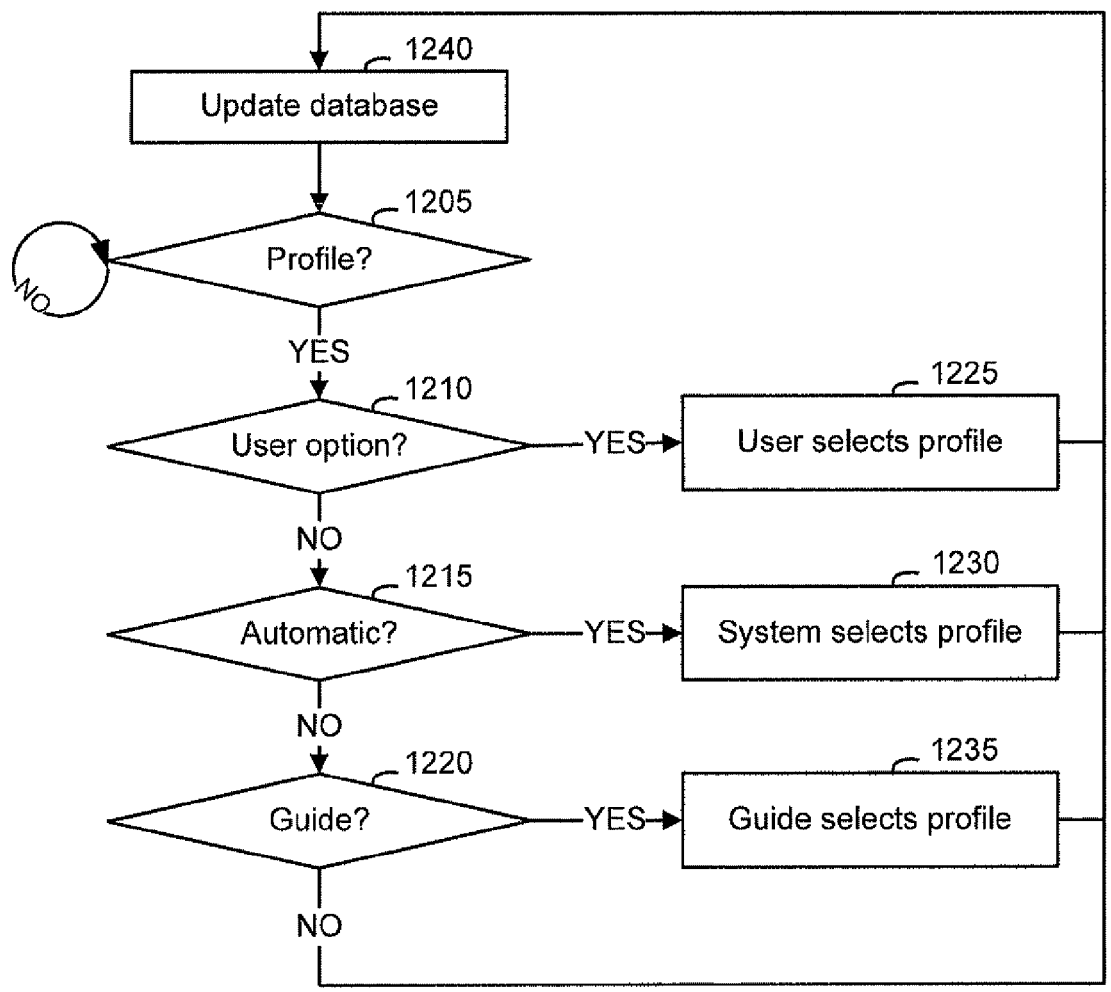
FIG. 12 is a flow diagram of a process for associating a profile with a query.

As illustrated in FIG. 12, a process 1200 for associating a profile with an item(s) is provided. An item includes but is not limited to a search query, an advertisement, a resource, and/or a search result.

In operation 1205 a determination is made as to whether a profile is to be associated with an item. If in operation 1205 it is determined that a profile is not to be associated with an item control remains at operation 1205 and process 1200 continues to wait. If in operation 1205 it is determined that a profile is to be associated with an item control is passed to operation 1210 and process 1200 continues. Although updating the database is illustrated as being performed prior to an operation (i.e., operation 1205 in FIG. 12), the present invention is not limited to updating the database at any particular time. For example, the database may be updated at a request, upon occurrence of a change to a stored record, etc.

In operation 1210 a determination is made as to whether a user may elect to associate a profile with an item. If in operation 1210 it is determined that a user may elect to associate a profile with an item control is passed to operation 1225 and process 1200 continues. If it is determined in operation 1210 that a user may not elect to associate a profile with an item control is passed to operation 1215 ad method 1200 continues.

The determination in operation 1210 may be made based on various criteria. In at least one embodiment, the determination in operation 1210 may be made based on information associated with a user and/or an item and/or a profile. For example, a user may not have created more than one profile, so a selection may not be required in order to associate a profile with an item, or a user may have designated a profile to be associated with any query associated with a category, a keyword, a location and/or other information or the search system 130 (FIG. 1) may or may not allow a user to associate a profile with an item for any reason.

In operation 1225 a profile is associated with an item by a user. For example, a user may select a profile based on a list provided by the search system 130 or a user may not make a selection, which may cause a profile to be associated with the item. Any action or inaction of a user(s) may be used to associate a profile with an item(s). Control is passed to operation 1240 and process 1200 continues.

In operation 1215 a determination is made as to whether a profile is to be automatically associated with an item. If in operation 1215 it is determined that a profile is to be automatically associated with an item control is passed to operation 1230 and process 1200 continues. If in operation 1215 it is determined that a profile is not to be automatically associated with an item control is passed to operation 1220 and process 1200 continues.

In operation 1230 a profile is associated with an item automatically. The association may be made based on any information indicated in the search system database 120 (FIG. 1). For example, a profile may be associated with an item based on a category(ies), keyword(s), or other information associated with the item, or a profile may be associated with a query based on information obtained from a device(s) and/or service(s) associated with the query. Control is passed to operation 1240 and process 1200 continues.

In operation 1220 a determination is made as to whether a guide is to associate a profile with an item. If in operation 1220 it is determined that a guide is to associate a profile with an item control is passed to operation 1235 and process 1200 continues. If in operation 1220 it is determined that a guide is not to associate a profile with an item control is passed to operation 1240 and process 1200 continues.

In operation 1235 a profile is associated with an item by a guide. A guide may associate a profile with an item based on information provided by the search system 130 (FIG. 1). For example, a list of profiles associated with an item might be presented in an order based on a ranking of the profile(s) associated with the item, and a guide may make a selection, which may affect a rating(s) of a profile associated with the item. For example if a query associated with a user is associated with a profile by a guide, the rating of the profile associated with the user may be increased, which may for example increase the probability that the profile will be associated with a query associated with the user. Control is passed to operation 1240 and process 1200 continues.

In operation 1240 the search system database 120 (FIG. 1) is updated. Information of a profile associated with an item(s) and/or other information may be recorded and/or modified. Control is passed to operation 1205 and process 1200 continues.

Figure 13:
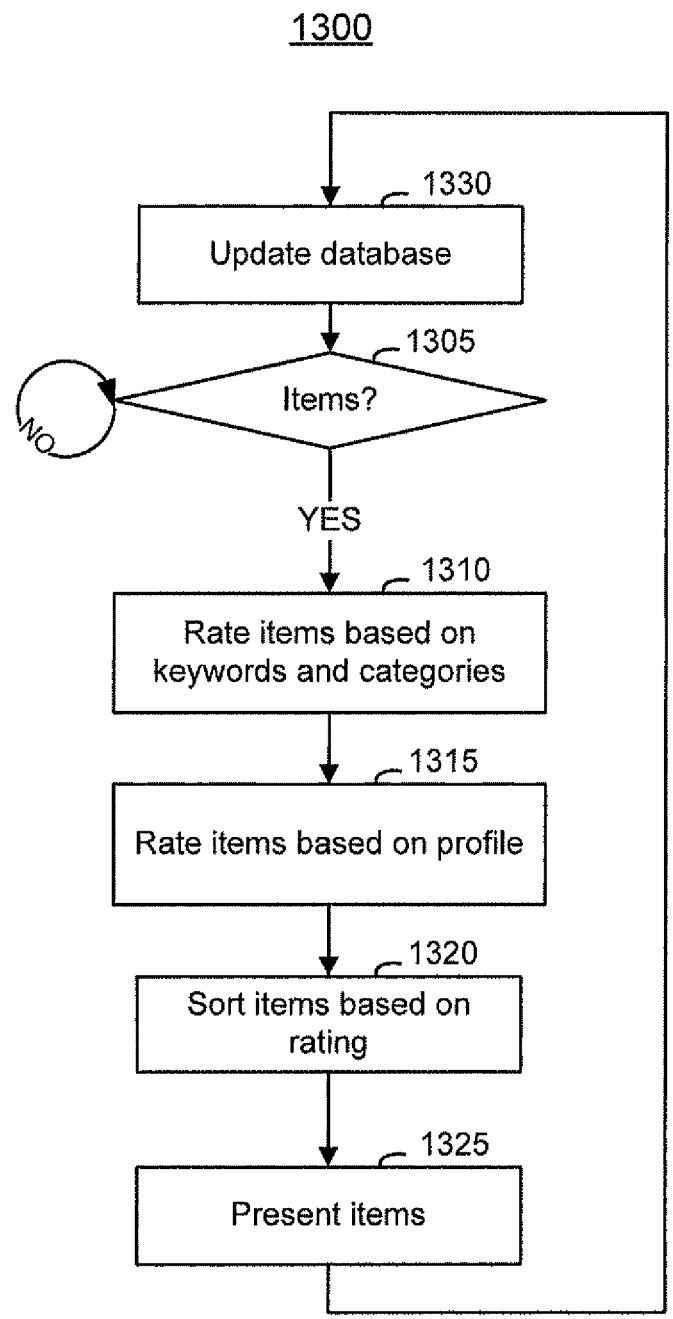
FIG. 13 is a flow diagram of a process for selecting an item(s).

As illustrated in FIG. 13, a process 1300 for selecting an item(s) associated with a query is provided.

In operation 1305 a determination is made as to whether an item is to be selected. If in operation 1305 it is determined that an item is not to be selected control remains at operation 1305 and process 1300 continues to wait. If in operation 1305 it is determined that an item is to be selected control is passed to operation 1310 and process 1300 continues.

In operation 1310 a number of items are rated based on a keyword(s), a category(ies), and/or other information not indicated in a profile associated with the query. For example, a rating(s) of a search resource(s) associated with a keyword(s) and/or category(ies) associated with a search request may be used to determine a rating(s) of the search resource(s) associated with the search request, or a rating(s) of a previous query(ies) associated with a keyword(s) and/or category(ies) associated with a search request may be used to determine a rating of the previous query(ies) associated with the search request, or a rating(s) of an advertisement(s) associated with a keyword(s) and an advertiser(s) associated with a user associated with a request may be used to determine a rating of the advertisement(s) associated with the request. Control is passed to operation 1315 and process 1300 continues.

In operation 1315 a number of items are rated based on a profile(s) associated with the search request. For example, a rating(s) of a search resource(s) associated with a guide profile(s) associated with a guide(s) selected to respond to a search request may be used to determine a rating(s) of the search resource(s) associated with the search request, or a rating(s) of an advertisement(s) associated with a user profile(s) associated with a search request may be used to determine a rating of the advertisement(s) associated with the search request. Any information included in the search system database 120 (FIG. 1) may be used to determine a rating of an item based on a profile(s) associated with a search request. Control is passed to operation 1320 and process 1300 continues.

In operation 1320 items are sorted or ranked. The ranking in operation 1320 may be based on rating information determined in operation 1310 and/or operation 1315 and/or other information indicated in the search system database 120 (FIG. 1). For example, if a search result is ranked first or second according to the rating information in operation 1310 and is ranked first according to the rating information in operation 1315 it may be ranked first, or rating information from operation 1310 may be averaged with rating information in operation 1315 and an items(s) may be sorted based on a resulting rating. In at least one embodiment, the ranking or rating from operation 1310 is not used and a ranking from operation 1315 is used to sort a search result(s). Any combination of information determined in operation 1310 and 1315 may be used to rank the items. Control is passed to operation 1325 and process 1300 continues.

In operation 1325 information of items ranked in operation 1320 is provided. For example a ranked list of any number and/or type of items may be presented to a person, or a URL which may provide access to information of the item(s) may be provided, etc. In at least one embodiment, a guide may select an item(s) to be associated with a request. In at least one embodiment, an item(s) may be selected automatically based on the ranking performed in operation 1325. Control is passed to operation 1330 and process 1300 continues.

In operation 1330 the search system database 120 (FIG. 1) is updated. Information of a rating(s) and/or rankings of any item(s) and/or other information may be recorded and/or updated. Control is passed to operation 1305 and process 1300 continues.

Figure 14:
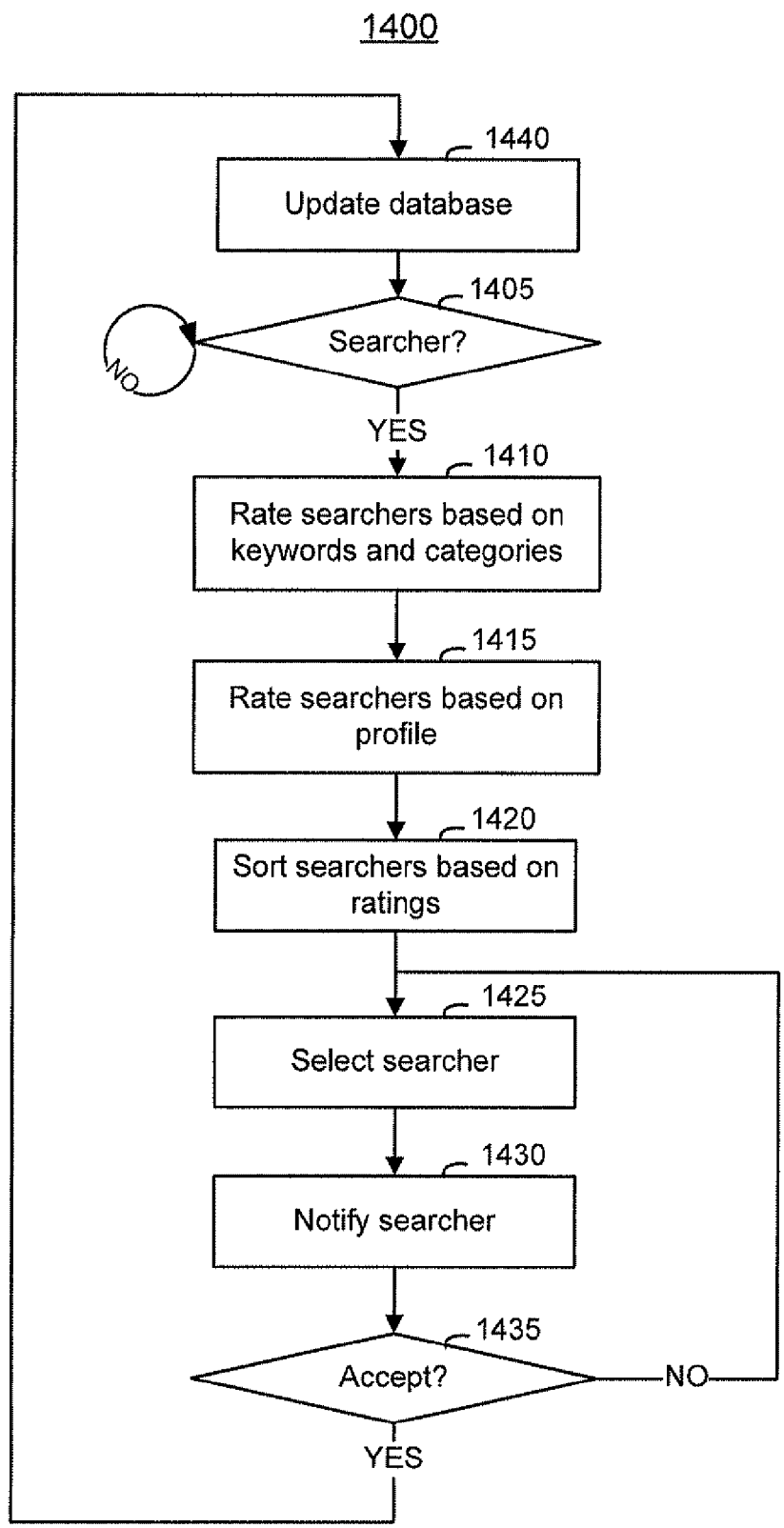
FIG. 14 is a flow diagram of a method for selecting a guide(s).

As illustrated in FIG. 14, a process 1400 for selecting a searcher or guide to respond to a query or search request is provided.

In operation 1405 a determination is made as to whether a guide is to be selected. If it is determined in operation 1405 that a guide is not to be selected control remains at operation 1405 and process 1400 continues to wait. If it is determined in operation 1405 that a guide is to be selected control is passed to operation 1410 and process 1400 continues.

In operation 1410 a guide(s) associated with a query are rated based on a keyword(s), a category(ies), and/or other information not indicated in a profile associated with the query. For example a rating(s) of a guide(s) associated with an advertiser associated with a query and a rating(s) of a guide(s) associated with a category associated with a query and a rating(s) of a guide(s) based on a number of searches completed by a guide may be used to determine a rating(s) of a guide(s) associated with a query. Any combination of rating information which is not indicated in a profile may be used to determine a rating of a guide(s) associated with a query. Control is passed to operation 1415 and process 1400 continues.

In operation 1415 a guide(s) associated with a query are rated based on a profile(s) associated with the query. For example a demographic profile of a user(s) associated with a search request may be compared to a demographic profile of a guide(s) in order to determine a rating(s) of the guide(s) associated with the search request, and geographic information associated with a query by the search system may be compared to a geographic profile of a guide(s) in order to determine a rating(s) of a guide associated with a search request. Any profile information associated with a search request may be compared to profile information associated with a guide in order to determine a rating(s) of a guide(s) associated with the search request. Control is passed to operation 1420 and process 1400 continues.

In operation 1420 a searcher(s) associated with a query is sorted or ranked. The sort operation in operation 1420 may be based on rating information determined in operation 1410 and/or operation 1415 and/or other information included in the search system database 120 (FIG. 1). For example, if a guide is ranked first or second according to rating information in operation 1410, and is rated first according to rating information in operation 1415, a guide may be ranked first, or rating information from operation 1410 may be averaged with rating information in operation 1415 and a searcher(s) may be ranked based on a resulting rating. In at least one embodiment, a ranking from operation 1410 is not used and a ranking from operation 1415 is used to sort a guide(s). Any ranking method based on information from operation 1410 and/or 1415 may be used within the scope of this disclosure. Control is passed to operation 1425 and process 1400 continues.

In operation 1425 a guide(s) is selected to respond to a search request. The selection may be based on an order determined by the sorting performed in operation 1420, and/or other information included in the search system database 120 (FIG. 1). In at least one embodiment, a search request may be offered to a searcher(s) in an order determined by the sort in operation 1420. Alternately, any guide(s) with a ranking greater than a predetermined value (e.g., the top three guides) may be selected. Membership in an affiliate group, membership in a list of preferred searchers associated with a user, or any other information indicated in the search system database 120 (FIG. 1) may be used to select a searcher. Control is passed to operation 1430 and process 1400 continues.

In operation 1430 a selected searcher(s) is notified of a search request. As previously mentioned, various types of communication sessions may be established by the system 100 and the selected searcher(s) may be notified of a search request using one or more services such as SMS, email, IM, chat, web based communication, etc. Control is passed to operation 1435 and process 1400 continues.

In operation 1435 a determination is made as to whether a search request is accepted. If it is determined in operation 1435 that a search request is not accepted control is passed to operation 1425 and process 1400 continues. If it is determined in operation 1435 that search request is accepted control is passed to operation 1440 and process 1400 continues.

In operation 1440 the search system database 120 (FIG. 1) is updated. Information of a rating(s) and/or rankings of a guide(s), a search request(s) and/or other information may be recorded and/or updated. For example, information of a guide(s) who accepted a search request may be recorded. Control is passed to operation 1405 and process 1400 continues.

A GUI 1500 which may be used to associate a profile with a search request is illustrated in FIG. 15.

The GUI 1500 includes selection tabs 1505, profile selection window 1510, a query box 1515, a categorization indicator 1520, a user identifier 1525, and a 'Submit' button 1530 and an advertising window 1540.

Figure 15A:
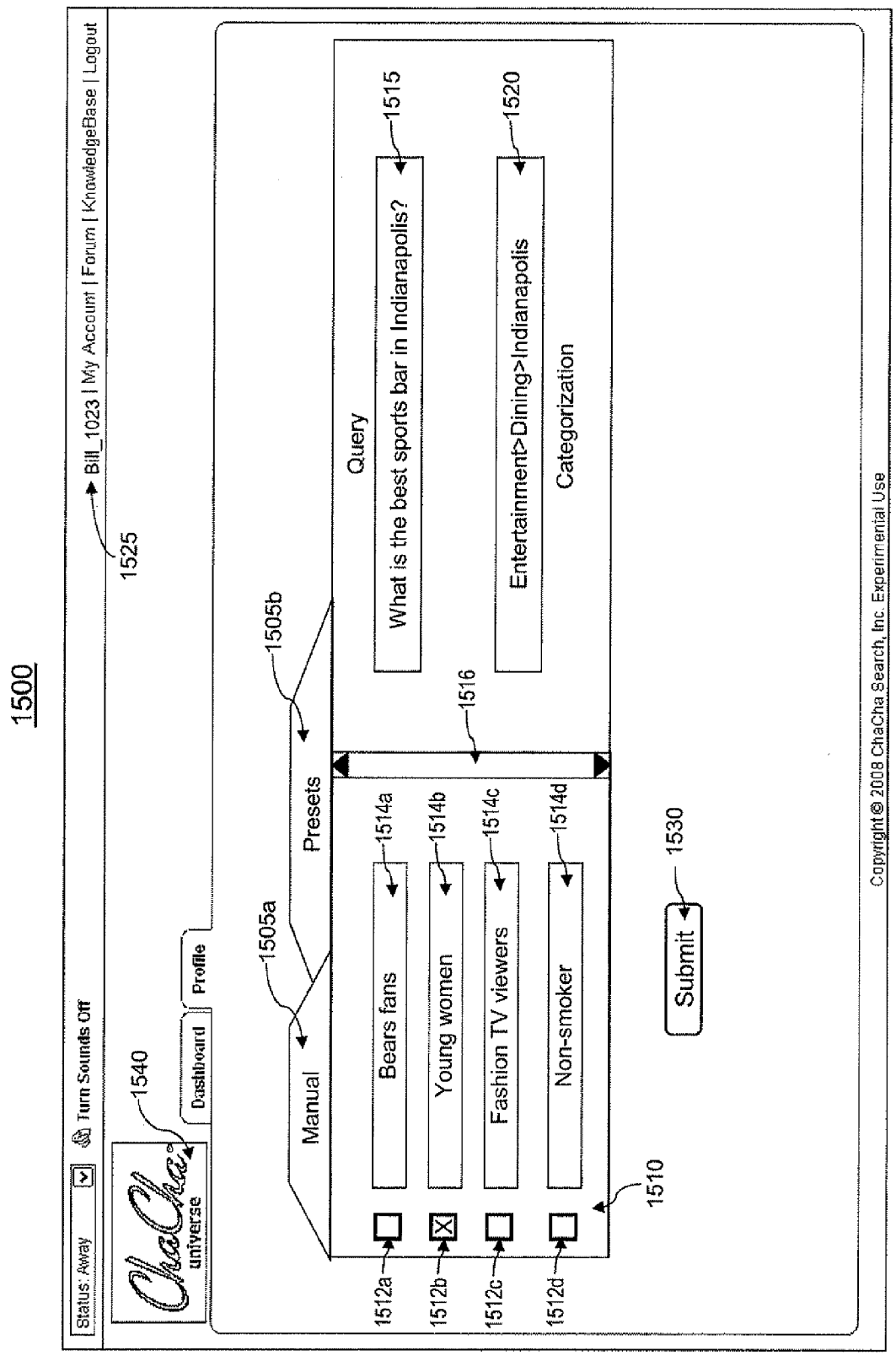
FIGS. 15A-15C illustrate exemplary user interfaces (UIs) for selection of a profile(s).

The selection tabs 1505 may be used to cause a GUI to be presented. As illustrated in FIG. 15A, activation of the 'Manual' tab 1505a may cause the GUI 1500 illustrated in FIG. 15A, to be presented. Activation of the 'Presets' tab 1505b may cause the GUI 1550 illustrated in FIG. 15B to be presented. Any number of selection tabs 1505 may be provided in the GUI 1500. The user identifier 1525 may display an identifier associated with a user. Activation of the user identifier 1525 may cause the GUI 1500 to be presented.

The profile selection window 1510 displays information of profiles which may be associated with a query. The profile selection window 1510 may include profile indicators 1514, profile selection controls 1512 and navigation controls 1516. The profile indicators 1514a-1514d which may be a drop-down menu, a prompted typing box, etc. may be used to indicate a profile which may be associated with a request. The profile selection controls 1512a-1512d may be used to indicate that a profile is to be associated with a search request indicated in the query box 1515. For example, activation of the profile selection control 1512b may cause the profile 'Young women' indicated in the profile indicator 1514b is to be associated with the query 'What is the best sports bar in Indianapolis?' indicated in the query box 1515. The navigation controls 1516 may be used to navigate within the profile selection window 1510. Any number of profile selection controls 1512 and profile indicators 1514 may be provided.

The query box 1515 may be used to provide information of a query. While a text query is used for the purposes of illustration in FIG. 15A, other types of information might be presented within the scope of the embodiments herein. For example, information of a user location, information associated with a user device, a media clip, an image, and/or any information associated with a query might be provided.

The categorization indicator 1520 may be used to indicate a category(ies) associated with a query. Information indicated in the query box 1515 and the categorization indicator 1520 may affect the content of the profile selection window 1510. The 'Submit' button 1530 may initiate a search based on information indicated in the GUI 1500.

The advertising window 1540 may be used to provide information of an advertisement(s). The content of the advertising window 1540 may be modified based on information indicated in the GUI 1500.

Figure 15B:
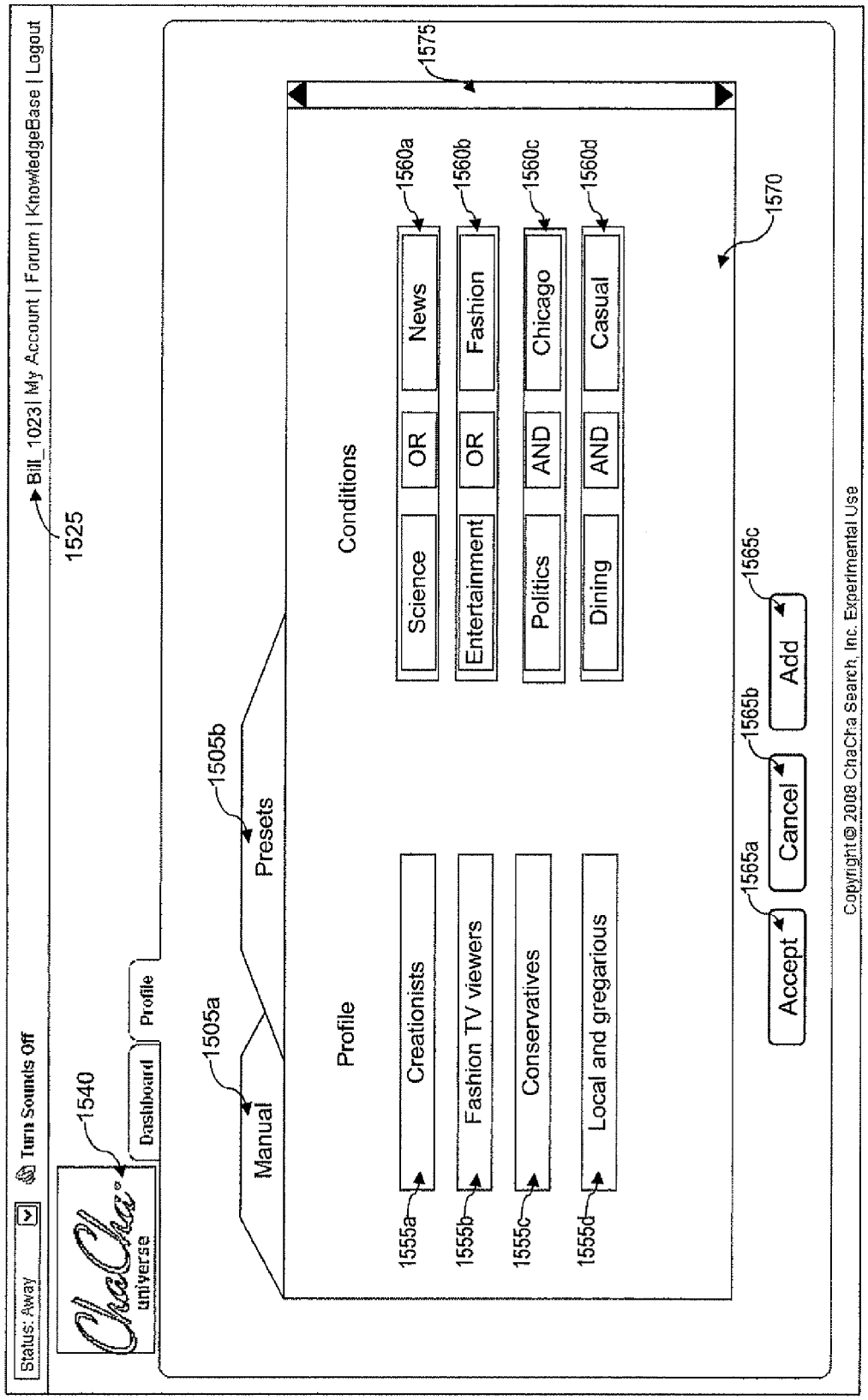

A GUI 1550 which may be used to associate a profile with a query based on a condition is illustrated in FIG. 15B.

The GUI 1550 includes selection tabs 1505, a user identifier 1525, profile selection boxes 1555, condition selection controls 1560, a profile condition window 1570, navigation controls 1575 and action buttons 1565.

The selection tabs 1505 may be used to cause a GUI to be presented. As illustrated in FIG. 15A, activation of the 'Manual' tab 1505a may cause the GUI 1500 illustrated in FIG. 15A, to be presented. Activation of the 'Presets' tab 1505b may cause the GUI 1550 illustrated in FIG. 15B to be presented. Any number of selection tabs 1505 may be provided in the GUI 1500. The user identifier 1525 may display an identifier associated with a user. Activation of the user identifier 1525 may cause the GUI 1500 to be presented.

The profile selection boxes 1555 may be used to select a profile(s) to be associated with a query based on a condition(s) identified using the condition selection controls 1560. Using the example illustrated in FIG. 15B, the profile selection box 1555a indicates that the profile 'Creationists' is to be associated with queries regarding 'Science' or 'News' as indicated in the condition selection control 1560a. The profile selection box 1555b indicates that the profile 'Fashion TV Viewers' to be associated with queries regarding 'Entertainment' or 'Fashion' as indicated in the condition selection control 1560b. The profile selection box 1555c indicates that the profile 'Conservatives' is to be associated with queries regarding 'Politics' and 'Chicago' as indicated in the condition selection control 1560c. The profile selection box 1555d indicates that the profile 'Local and gregarious' is to be associated with queries regarding 'Dinging' and 'Casual' as indicated in the condition selection control 1560d. Any number of profile selection boxes 1555 and condition selection controls may be provided in the profile condition window 1570.

The condition selection controls 1560 may be used to identify any type of condition which may cause a profile to be associated with a query. Any condition based on information which may be associated with a query may be identified to associate a profile(s) with a query using controls such as the condition selection controls 1560. For example, a profile indicated in the profile selection boxes may be associated with a categorization, a location, a system or service, a time of day, and/or other condition(s) which may be identified using the condition selection controls 1560.

The action buttons 1565 may be used to take actions regarding information indicated in the GUI 1550. The 'Accept' button 1565a may be used record information indicated in the GUI 1550. The 'Cancel' button 1565b may be used discard information indicated in the GUI 1550. The 'Add' button 1565c may be used to add a profile selection box 1555 and a condition selection control 1560 to the profile condition selection window 1570. The navigation controls 1575 may be used to navigate within the profile condition selection window 1570.

Figure 15C:
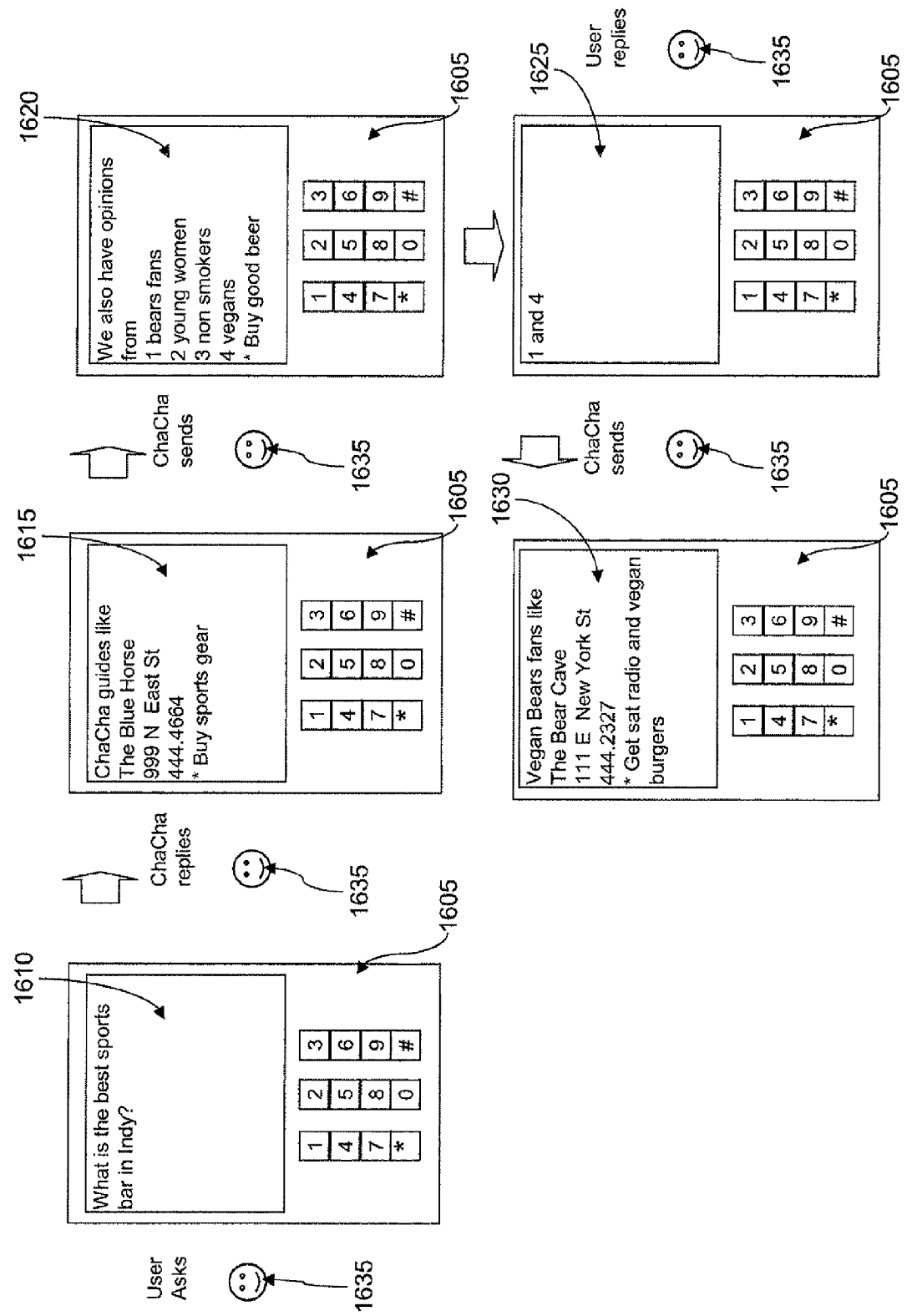

A user of an information seeker system such as the user system 135 (FIG. 1) may access the search system using a mobile device. An exemplary process whereby such a user may elect to associate a profile with a query is illustrated in FIG. 15C.

The user 1630 may send the query message 1610 which may for example be an SMS message to the search system 130 (FIG. 1) using the user device 1605. The search system 130 may process the query message 1610 and may transmit the search result message 1615 including a search result and/or advertising message which may or may not be based on a profile associated with the user 1635. The search system 130 may send the opinion request message 1620, which may optionally be included in the search result message 1615 which may inform the user 1635 of a number of other types of search results which may be available based on one or more profiles indicated in the search system database 120 (FIG. 1). The user 1635 may reply with the response message 1625 which may indicate a preference(s) of the user. The search system 130 may process the response message 1625 and may reply with the profile based response message 1630, which may be based at on a profile(s). In at least one embodiment, a guide may be selected based on the profile indicated in the response message 1625. In at least one embodiment, a search result associated with one or more guide(s) associated with a profile indicated in the response message 1625 may be provided.

The mobile device 1605 may be any device which may be used to submit a request to the search system 130 (FIG. 1). Any or all of the messages illustrated may include an advertisement(s) which may be based on a profile associated with a user based on a unique identifier of the user. As previously noted with respect to FIG. 2 and FIG. 4, personally identifying information of a user is not required in order for profile information to be associated with the user and/or a user request.

While the example of a text message has been used for the purposes of illustration, no limitation is implied thereby any type of message and/or service(s) associated with a user and the search system 130 may be used to associate profile information with a user and/or a search request.

Figure 16A:
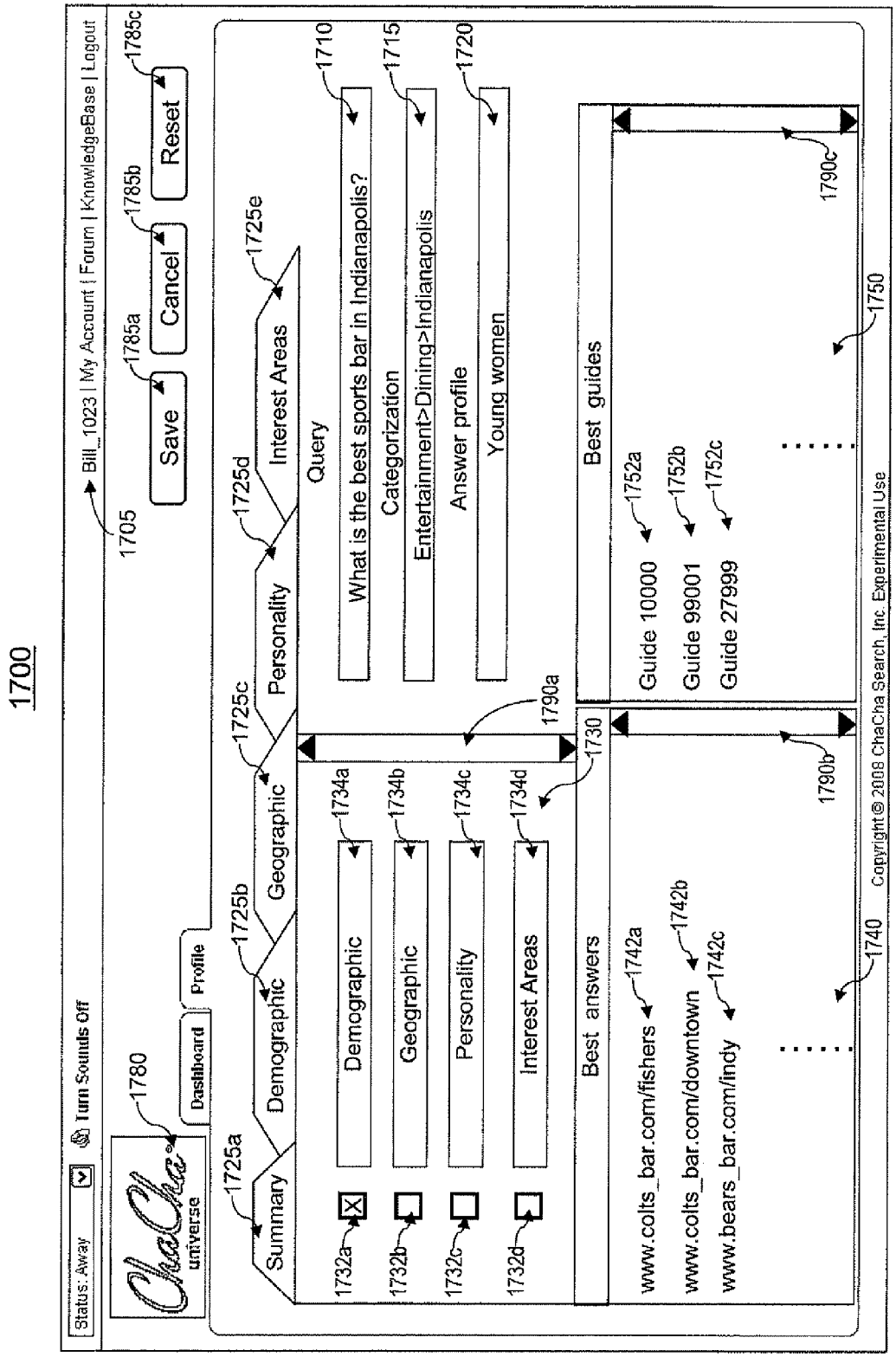
FIGS. 16A-16B illustrate exemplary GUIs for selection of items associated with a query and a profile.

A GUI 1700 for selection of a searcher and/or search result(s) based on a profile is illustrated in FIG. 16A.

The GUI 1700 includes a user indicator 1705, a query box 1710, a categorization indicator 1715, a profile indicator 1720, selection tabs 1725, profile summary window 1730, search result window 1740, guide information window 1750, advertising window 1780, and action buttons 1785.

The query box 1710 may be used to provide information of a query. While a text query is used for the purposes of illustration in FIG. 16A, other types of information might be presented within the scope of the embodiments herein. For example, information of a user location, information associated with a user device, a media clip, an image, and/or any information associated with a query might be provided.

The categorization indicator 1715 may be used to provide information of a category(ies) associated with a query. Information such as a structured query(ies) and/or other information associated with a query might be indicated in the categorization indicator 1715. In the example in FIG. 16A, the category 'Entertainment>Dining>Indianapolis' is associated with the query 'What is the best sports bar in Indianapolis?'

The profile indicator 1720 may be used to indicate information of a profile associated with a query. Continuing with the example illustrated in FIG. 16A, the profile 'Young women' has been associated with the query 'What is the best sports bar in Indianapolis?'.

Activation of the selection tabs 1725 may change the content of the GUI 1700. For example, activation of the 'Summary' selection tab 1725a may cause the profile summary window 1730 to be provided, activation of the 'Demographic' selection tab 1725b may cause the demographic information window 1770 illustrated in FIG. 16B to be provided activation of the 'Geographic' selection tab 1725c, the 'Personality' selection tab 1725d, and the 'Interest Area' selection tab 1725e may cause a window associated with those elements of a profile to be presented in the GUI 1700.

As illustrated in FIG. 16A a summary of elements of a profile which is associated with a query is presented in the profile summary window 1730. The profile information indicators 1734 may be used to indicate a classification of characteristics of a profile associated with a query. The information selection indicators 1732 may be used to indicate if a group of characteristics indicated in the profile information indicators 1734 is included in a profile indicated in the profile indicator 1720. The profile information indicators 1734 may be used to indicate a type of information associated with a profile. The profile information indicator 1734a indicates that 'Demographic' information may be associated with a profile by activating the selection indicator 1732a, the profile information indicator 1734b indicates that 'Geographic' information may be associated with a profile by activating the selection indicator 1732b, the profile information indicator 1734c indicates that 'Personality' information may be associated with a profile by activating the selection indicator 1732c, and the profile information indicator 1734d indicates that 'interest Area' information may be associated with a profile by activating the selection indicator 1732d. Any number of selection indicators 1732 and profile information indicators 1734 may be provided in the profile summary window 1730. The navigation controls 1790a may be used to navigate within the profile summary window 1730.

The search result window 1740 may provide information of a ranking of a search result(s) which may be based on information indicated in the GUI 1700. For example, a search result(s) may be presented in an order based on a ranking of the search result(s) associated with a profile selected using the GUI 1700. The search result information indicators 1742 may be used to indicate information of a search result. The 'www.colts_bar.com/fishers' URL is indicated in the search result indicator 1742a, the 'www.colts_bar.com/downtown' URL is indicated in the search result indicator 1742b, and the 'www.colts_bar.com/fishers' URL is indicated in the search result indicator 1742c. A search result may be selected by activating a search result indicator 1742. For example, 'double-clicking' on the search result indicator 1742b may cause a web-page associated with the URL to be provided, or may transmit a message associated with the search result to a system (e.g. an SMS message might be sent to a user device). Any number of search result indicators 1742 may be provided in the search result window 1740. The navigation controls 1790b may be used to navigate within the search result window 1740.

The guide information window 1750 may provide information of a ranking of a searcher(s) which may be based on information indicated in the GUI 1700. For example, a searcher(s) may be presented in an order based on a ranking of the searcher(s) associated with a profile selected using the GUI 1700. The searcher information indicators 1752 may be used to indicate information of a searcher. The searcher 'Guide 10000' is indicated in the searcher indicator 1752a, the searcher 'Guide 99001' is indicated in the searcher indicator 1752b, and the searcher 'Guide 27999' is indicated in the searcher indicator 1752c. A guide may be selected by activating a searcher indicator 1752. For example, 'double-clicking' on the searcher indicator 1752b may cause information of a search request to be provided to the searcher 'Guide 99001'. Any number of searcher indicators 1752 may be provided in the guide information window 1750. The navigation controls 1790c may be used to navigate within the search result window 1750.

The advertising window 1780 may be used to provide information of an advertisement(s). Any number of advertising windows 1780 may be provided. The information indicated in the may be modified based on information indicated in the GUI 1700.

The action buttons 1785 may be used to take actions regarding the information indicated in the GUI 1700. The 'Save' action button 1785a may be used to record information indicated in the GUI 1700 in the search database 120. The 'Cancel' action button 1785b may be used to discard information indicated in the GUI 1700. The 'Reset' action button 1785c may be used to reset the information indicated in the GUI 1700 to values previously recorded in the search database 120.

The demographic information window 1770 (FIG. 16B) may include profile parameter selection indicators 1772, profile parameter value indicators 1774, and navigation controls 1790d. The profile parameter selection indicators 1772 may be used to indicate whether a parameter indicated in the profile parameter value indicators 1774 is to be included in a profile. The profile parameter selection indicator 1772*a* may be used to indicate that the gender parameter selected using the profile parameter value indicator 1774*a* is to be included in the profile 'young atheist women'. The profile parameter selection indicator 1772*b* may be used to indicate that the age parameter selected using the profile parameter value indicator 1774*b* is to be included in the profile 'young atheist women'. The profile parameter selection indicator 1772*c* may be used to indicate that the religious preference parameter selected using the profile parameter value indicator 1774*c* is to be included in the profile 'young atheist women'. The navigation controls 1790*d* may be used to navigate within the demographic information window 1770.

Figure 16B:
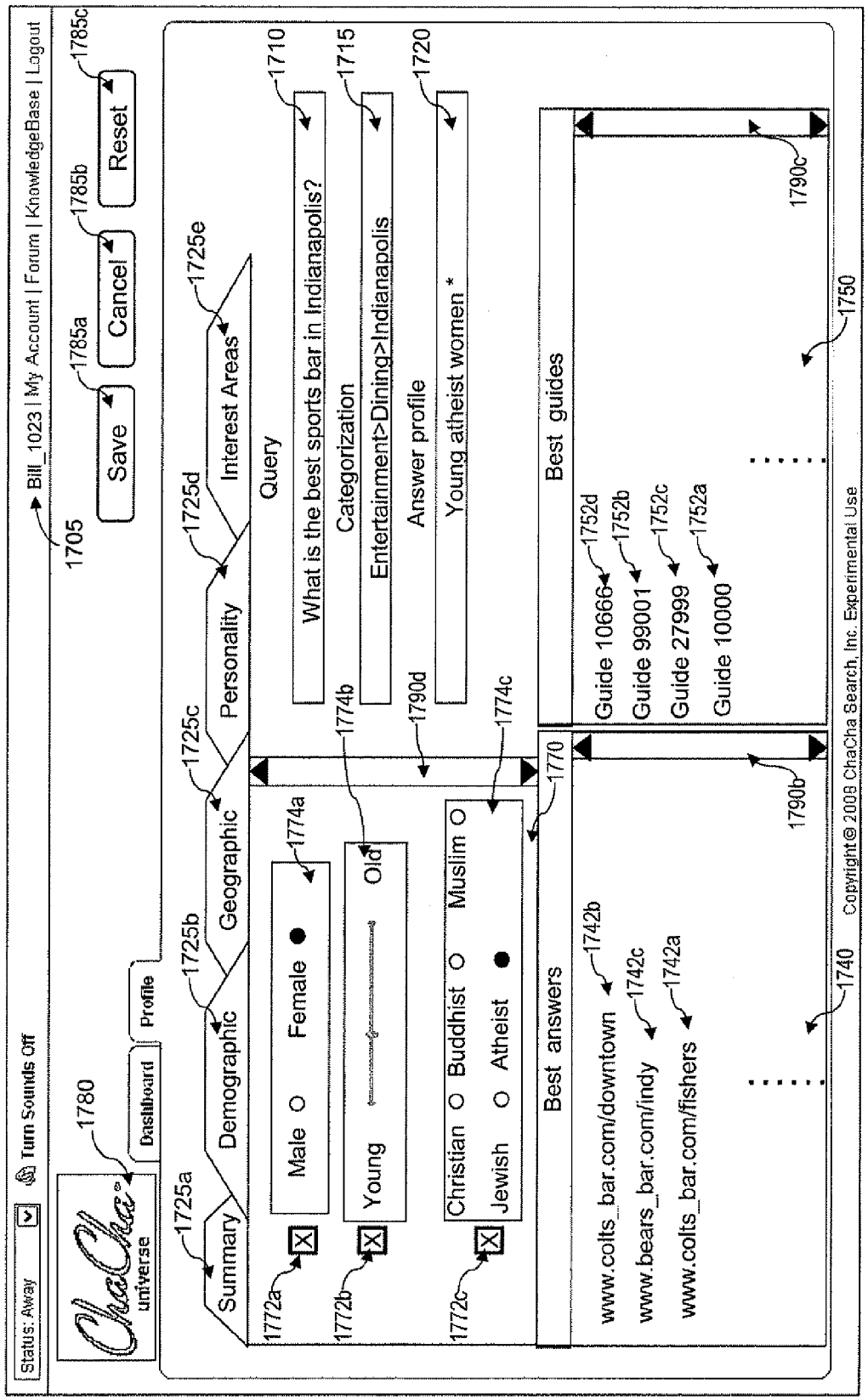

If the content of a profile has been modified, but has not been recorded, it may be indicated in the profile indicator 1720, as indicated by for example the * as illustrated in FIG. 16B. Any type of indication such as a color or shading might be used to indicate that content of a profile has been modified.

Modification of the profile indicated in the profile indicator 1720 may cause a change in the information indicated in the search result window 1740 and the guide information window 1750. For example if a profile is selected using the profile indicator 1720 which may be a drop-down list prompted typing box, etc. the content of the search result window 1740 and the guide information window 1750 may change. Likewise, as modifications are made to a profile using controls such as those included in the profile summary window 1730 or the demographic information window 1770, the content of the search result window 1740 and the guide information window 1750 may change. Using the example illustrated in FIG. 16B selection of the profile 'young atheist women' caused the search result 'www.colts_bar.com/fishers' as indicated in the search result indicator 1742*a* to be ranked below the search results 'www.colts_bar.com/downtown' indicated in the search result indicator 1742*b* and 'www.bears_bar.com/indy' indicated in the search result indicator 1742*c*. Similarly the guide 'Guide 10666' indicated in the searcher indicator 1752*d* is the top-ranked guide, and the guide 'Guide 10000' indicated in the searcher indicator 1752*a* is ranked fourth.

Using the method and system described herein a request submitted by a user of a human-assisted search system may be associated with a profile. Profile information associated with a query may be used to select a searcher based at least in part on a profile associated with the searcher. A searcher, a search result(s), an advertisement(s), and/or other item(s) may be associated with a profile which may be used to match the item(s) to a user request. A rating(s) of an item(s) associated with profile may be based on a profile associated with a searcher who has expressed an opinion regarding the item. Information of a profile may include demographic, geographic, personality, interest areas, purchase habits, political views and/or any other type of information which may be associated with a person(s). A profile(s) may be used to affect the ranking of an item in a selection process. A profile associated with a query or request may improve the relevance of any item such as guide(s), a search result(s), an advertisement(s), a search resource(s), a category(ies), a keyword(s) or other item(s) which may be selected by the search system responsive to the request.

A user query may be associated with a profile based on an automatic selection, a selection by a guide(s), an action of a user(s) and/or other information associated with the query. A guide may be associated with a profile based on any information which may be provided to the search system 130 (FIG. 1). Matching criteria may be determined based on the type(s) of information in a profile.

While the system has been described in the context of a search system wherein a query from a user is matched with a searcher and/or search result, other types of businesses might utilize the method and system. For example, a supplier of products and/or services might utilize profile-based matching to improve selection of a sales assistant and/or products to a user request. Likewise, a provider of news, music, or other types of information might utilize profile based matching to select an item(s) or an advisor(s) based on a profile associated with a user request. In other embodiments a provider of transcription and/or translation services might utilize the method and system to match a user request to a provider of services.

The many features and advantages of the claimed invention are apparent from the detailed specification and, thus, it is intended by the appended claims to cover all such features and advantages of the claimed invention that fall within the true spirit and scope of the invention. Further, since numerous modifications and changes will readily occur to those skilled in the art, it is not desired to limit the invention to the exact construction and operation illustrated and described for the disclosed embodiments, and accordingly all suitable modifications and equivalents may be resorted to, falling within the scope of the claimed invention. It will further be understood that the phrase "at least one of A, B and C" may be used herein as an alternative expression that means "one or more of A, B and C."

What is claimed is:

1. A method, comprising:
receiving a search request from a source;
associating the search request with a value of a characteristic of a human assistant obtained from profiles of human assistants comprising at least one of demographic, geographic, personality and interest area information;
selecting a human searcher based on a ranking of the human searcher for the characteristic;
the human searcher performing a search based on a query;
recording a result of the search in a database in association with the query;
providing the result responsive to the search request when the search request is submitted subsequent to the human searcher performing the search;
ranking the result based on a match of the query to the search request;
providing the result based on the ranking and a rating of the human searcher for the value and the characteristic;
assigning to an item a profile of a human guide when the human guide takes an action indicating the item;
rating, by a processor, the item based on the search request and the query;
ranking the item based on a match of the profile assigned to the item to the value and the characteristic associated with the search request; and
selecting the item responsive to the search request based on the rating of the item and the ranking of the item.

2. The method of claim 1, wherein the item is an available human searcher.

3. The method of claim 1, wherein the characteristic is geographic information.

4. The method of claim 1, wherein the characteristic is demographic information.

5. The method of claim 1, wherein the value of the characteristic is provided by a person selected for the search request and the characteristic excludes subject matter of the search request.

6. The method of claim 5, wherein the value of the characteristic is provided by the source of the search request.

7. The method of claim 1, wherein the assigning is based on an action of a person expressing an opinion regarding the item.

8. The method of claim 1, wherein the associating is performed based on a selection of a description of the human assistant.

9. The method of claim 1, wherein the item is one of a search result, an advertisement, a category and a keyword and is determined to be relevant to the search request by the human searcher selected based on the value of the characteristic.

10. A method, comprising:
performing a selection based on an association of a search request with an item;
associating the search request with a value of a characteristic of a human assistant obtained from profiles of human assistants comprising at least one of demographic, geographic, personality and interest area information;
selecting a human searcher based on a ranking of the human searcher for the characteristic;
the human searcher performing a search based on a query;
recording a result of the search in a database in association with the query;
providing the result responsive to the search request when the search request is submitted subsequent to the human searcher performing the search;
ranking the result based on a match of the query to the search request;
providing the result based on the ranking and a rating of the human searcher for the value and the characteristic;
linking the item with a profile of a human assistant when an action of the human assistant indicates an opinion regarding the item;
associating a property different than the search request and indicated in the profile with the search request;
obtaining a rank of the item based on content of a query of the search request;
receiving a rating of the profile for the property;
performing, by a processor, the selection based on the rank and the rating; and
presenting information of the item responsive to the search request in accordance with said selection.

11. The method of claim 10, wherein the linking is based on an action of the human assistant and the item is one or more of a resource used to perform a search, a search result of the human searcher and an advertisement associated with the human searcher.

12. The method of claim 10, wherein said information indicates a number of items distinguished by the property, and said items are ranked and presented in an order based on the ranking.

13. The method of claim 10, wherein said presenting includes displaying the information to a user submitting the search request.

14. The method of claim 13, wherein said linking includes parsing content of the query of the search request and generating a profile for the search request, the profile including the property based on the content of the query.

15. The method of claim 14, wherein said associating is executed by the human searcher presented with information of a user determined by the search request.

16. The method of claim 10, wherein said linking is based on a category determined based on a classification of a keyword of the search request and a value of the property associated with the category by a user submitting the search request.

17. The method of claim 10, wherein the search request is submitted from a mobile device.

18. A non-transitory computer-readable storage medium having embodied therein an instruction causing a computer to execute an operation, comprising:
receiving a search request from a source;
associating the search request with a value of a characteristic other than subject matter indicated by the search request obtained from profiles of human assistants comprising at least one of demographic, geographic, personality and interest area information;
selecting a human searcher based on a ranking of the human searcher for the characteristic;
the human searcher performing a search based on a query;
recording a result of the search in a database in association with the query;
providing the result responsive to the search request when the search request is submitted subsequent to the human searcher performing the search;
ranking the result based on a match of the query to the search request;
providing the result based on the ranking and a rating of the human searcher for the value and the characteristic;
associating a human assistant with an item when determining that the human assistant has provided an opinion regarding the item;
determining a profile including the characteristic based on the human assistant;
associating the profile with the item;
rating the item based on the subject matter of the search request and a query provided to the human assistant when the opinion is obtained;
ranking the item based on the profile and the value; and
selecting the item responsive to the search request based on the ranking and the rating.

19. An apparatus, comprising:
a search system comprising a computer receiving a search request, performing a selection based on the search request of an item associated with a human searcher, linking the item and a profile including a property of the human searcher other than subject matter indicated by the search request obtained from profiles of human assistants comprising at least one of demographic, geographic, personality and interest area information when the human searcher takes an action indicating an opinion regarding the item, selecting the human searcher based on a ranking of the human searcher for a characteristic, the human searcher performing a search based on a query, recording a result of the search in a database in association with the query, providing the result responsive to the search request when the search request is submitted subsequent to the human searcher performing the search, ranking the result based on a match of the query to the search request, providing the result based on the ranking and a rating of the human searcher for a value and the characteristic, associating the search request with a value of the property determined based on a user, selecting the item based on a rank of the item, determining the rank based on a match of the item to the subject matter of the search request and the value of the property and the profile; and a user system providing the search request and receiving the item in accordance with said selection.

* * * * *